(12) United States Patent
Koorapaty et al.

(10) Patent No.: US 10,812,962 B2
(45) Date of Patent: Oct. 20, 2020

(54) ALIGNING MEASUREMENT GAPS AND DISCOVERY SIGNALS

(71) Applicant: Telefonaktiebolaget LM Ericsson (publ), Stockholm (SE)

(72) Inventors: Havish Koorapaty, Saratoga, CA (US); Tao Cui, Upplands Väsby (SE); Sorour Falahati, Stockholm (SE); Mats Folke, Luleå (SE); Daniel Larsson, Vallentuna (SE); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 15/985,826

(22) Filed: May 22, 2018

(65) Prior Publication Data

US 2018/0270644 A1 Sep. 20, 2018

Related U.S. Application Data

(63) Continuation of application No. 14/786,405, filed as application No. PCT/SE2015/050857 on Aug. 7, 2015, now Pat. No. 10,045,193.

(Continued)

(51) Int. Cl.
*H04W 8/00* (2009.01)
*H04W 76/28* (2018.01)
(Continued)

(52) U.S. Cl.
CPC .......... *H04W 8/005* (2013.01); *H04W 48/12* (2013.01); *H04W 76/28* (2018.02); *H04L 5/0048* (2013.01);
(Continued)

(58) Field of Classification Search
None
See application file for complete search history.

(56) References Cited

U.S. PATENT DOCUMENTS

| | | | | |
|---|---|---|---|---|
| 2009/0034452 | A1* | 2/2009 | Somasundaram ... | H04J 11/0069 370/328 |
| 2011/0103250 | A1* | 5/2011 | Li ......................... | H04L 5/0016 370/329 |

(Continued)

OTHER PUBLICATIONS

3GPP TSG-RAN WG2 #86; Seoul, Korea; Source: NVIDIA; Title: Small cell on/off and discovery considerations (R2-142694) May 19-23, 2014.

(Continued)

*Primary Examiner* — Rebecca E Song
(74) *Attorney, Agent, or Firm* — Baker Botts, LLP

(57) ABSTRACT

According to some embodiments, a method in a network node of a wireless network for aligning discovery reference signal (DRS) occurrences comprises determining a first DRS occurrence configuration that comprises a schedule for transmission of a first series of DRS occurrences. The method further comprises determining a first discovery measurement timing configuration (DMTC) that comprises a schedule for receiving DRS occurrences that is aligned with a first subset of DRS occurrences of the first series of DRS occurrences. The method further comprises determining a second DMTC that comprises a schedule for receiving DRS occurrences that is aligned with a second subset of DRS occurrences of the first series of DRS occurrences, wherein the second subset of DRS occurrences is different than the first subset of DRS occurrences. The method further comprises communicating first DMTC to a first wireless device and the second DMTC in a second wireless device.

6 Claims, 12 Drawing Sheets

Related U.S. Application Data

(60) Provisional application No. 62/034,621, filed on Aug. 7, 2014.

(51) Int. Cl.
| | |
|---|---|
| *H04W 48/12* | (2009.01) |
| *H04L 5/00* | (2006.01) |
| *H04W 48/16* | (2009.01) |
| *H04W 88/02* | (2009.01) |
| *H04W 88/08* | (2009.01) |

(52) U.S. Cl.
CPC ........... *H04W 48/16* (2013.01); *H04W 88/02* (2013.01); *H04W 88/08* (2013.01)

(56) References Cited

U.S. PATENT DOCUMENTS

| | | | | |
|---|---|---|---|---|
| 2012/0113905 | A1 | 5/2012 | Anderson | |
| 2014/0301301 | A1 | 10/2014 | Cheng | |
| 2015/0223245 | A1 | 8/2015 | Cheng | |
| 2016/0219475 | A1* | 7/2016 | Kim | H04W 76/27 |
| 2016/0234762 | A1* | 8/2016 | You | H04J 11/0056 |
| 2017/0055202 | A1 | 2/2017 | Uchiyama | |
| 2017/0070312 | A1* | 3/2017 | Yi | H04J 11/0069 |
| 2017/0195028 | A1* | 7/2017 | Shimezawa | H04W 28/06 |
| 2017/0257785 | A1 | 9/2017 | Henttonen | |

OTHER PUBLICATIONS

3GPP TSG-RAN2 #86 Meeting; Seoul, South Korea, Source: MediaTek Inc.; Title: DRS impacts on RRM Measurement (R2-142176) May 19-23, 2014.
PCT International Search Report for International application No. PCT/SE2015/050857—dated Feb. 1, 2016.
PCT Notification of Transmittal of the International Search Report and the Written Opinion of the International Searching Authority, or the Declaration for International application No. PCT/SE2015/050857—dated Feb. 1, 2016.
PCT Written Opinion of the International Searching Authority for the International application No. PCT/SE2015/060857—dated Feb. 1, 2016.
3GPP TSG-RAN #77; Seoul, Korea: Source: ZTE; Title: On DRS measurement configuration (R1-142225)—May 19-23, 2014.
3GPP TSG-RAN WG1-77; Seoul, Korea; Source: Motorola Mobility; Title: Measurement Gaps for Small cell on/off (R1-142500)—May 19-23, 2014.
3GPP TSG RAN WG1 Meeting #77; Seoul, Korea; Source: Huawei, HiSilicon; Title: RRM measurement procedures with DRS (R1-141917)—May 19-23, 2014.
3GPP TSG-RAN WG1 Meeting #76; Prague, Czech Republic; Source: Broadcom Corporation; Title: Small cell discovery and measurements (R1-140610)—Feb. 10-14, 2014.
3GPP TSG RAN WG1 Meeting #77; Seoul, Korea; Source: LG Electronics; Title: DRS-based measurements with network assistance (R1-142138)—May 19-23, 2014.
3GPP TSG-RAN WG1 Meeting #77; Seoul, Korea; Source: Broadcom Corporation; Title: Small Cell On/Off procedures for Single Carrier case (R2-142125)—May 19-23, 2014.
3GPP TSG RAN WG1 Meeting #77; Seoul, Korea: Source: ZTE; Title: Procedures for small cell on/off transition time reduction (R1-142239)—May 19-23, 2014.
3GPP TSG-RAN WG4 Meeting #71 AH on Rel-12 RRM; Source: Nokia Corporation, NSN; Title: Small cell on/off DRS CRS based core requirements (R4-71AH-0071)—Jun. 24-26, 2014.
PCT Invitation to Pay Additional Fees and, Where Applicable, Protest Fee for international application No. PCT/SE2015/050857—dated Nov. 16, 2015.
3GPP TSG RAN WG1 Meeting #77; Seoul, Korea; Source: Huawei, HiSilicon; Title: RRM measurement procedures with DRS (R1-141911)—May 19-23, 2014.
3GPP TSG-RAN WG4 Meeting #70bis; San Jose Del Gabo, Mexico; Source; Nokia Corporation, NSN; Title: Small Cell Enhancements and cell detection (R4-142253)—Mar. 31-Apr. 4, 2014.
3GPP TR 36.872 v12.0.0; Technical Report; 3rd Generation Partnership Project; Technical Specification Group Radio Access Network; Small cell enhancements for E-UTRA and E-UTRAN—Physical layer aspects (Release 12)—Sep. 2013.
3GPP TSG RAN Meeting #62; Busan, Korea; Source: Huawei, CATR, HiSilicon; Title: Small cell enhancements—physical layer aspects—Feature (RP-132073)—Dec. 3-6, 2013.
3GPP TSG RAN Meeting #62; Busan; Korea; Source: Huawei, CATR, HiSilicon; Title: Small cell enhancements—physical layer aspects—core part (RP-132073)—Dec. 3-6, 2013.
3GPP TSG RAN Meeting #62; Busan, Korea; Source: Huawei, CATR, HiSilicon; Title: Small cell enhancements—physical layer aspects—performance part (RP-132073)—Dec. 3-6, 2013.
European Patent Office, Communication pursuant to Article 94(3) EPC, Ref. No. P44264 EP1, Application No. 15754052.7-1217; dated Nov. 29, 2018; 4 pages.
European Patent Office, Communication, Extended European Search Report, Reference No. P44264 EP2; Application No./Patent No. 19198968.0-1214; dated Nov. 12, 2019; 11 pages.
3GPP TSG-RAN1#77; Seoul, Korea May 19-May 23, 2014; ZTE; Title: On DRS measurement configuration; R1-142225.
3GPP TSG-RAN WG1-77; May 19-23, 2014, Seoul, Korea; Motorola Mobility; Title: Measurement Gaps for Small cell on/off; R1-142500.
3GPP TSG RAN WG1 Meeting #77; Seoul, Korea; May 19-23, 2014; Huawei, HiSilicon; Title: RRM measurement procedures with DRS; R1-141917.
Indian Patent Office, Subject: Examination report under sections 12 & 13 of the Patents Act, 1970 and the Patents Rules, 2003, application No. 201617043156, dated Jan. 24, 2020.

* cited by examiner

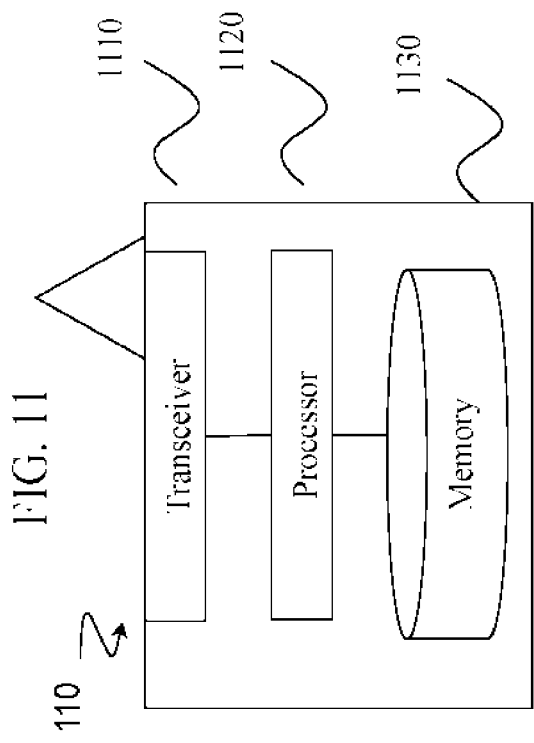
FIG. 11
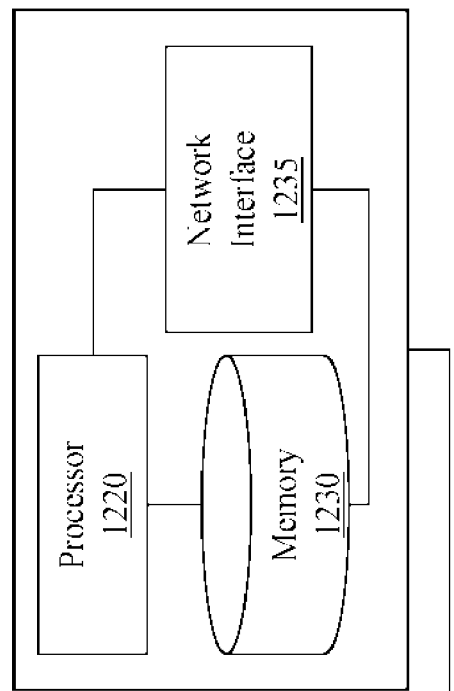
FIG. 12
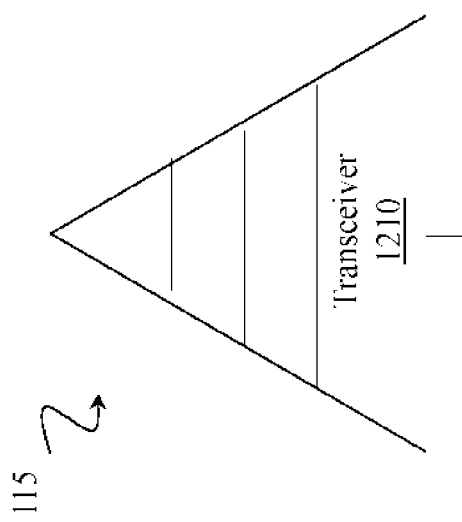

ALIGNING MEASUREMENT GAPS AND DISCOVERY SIGNALS

PRIORITY

This application is a continuation, under 35 U.S.C. § 120, of U.S. patent application Ser. No. 14/786,405 filed on Oct. 22, 2015, which is a U.S. National Stage Filing under 35 U.S.C. § 371 of International Patent Application Serial No. PCT/SE2015/050857 filed Aug. 7, 2015, and entitled "Aligning Measurement Gaps and Discovery Signals" which claims priority to U.S. Provisional Patent Application No. 62/034,621 filed Aug. 7, 2014, all of which are hereby incorporated by reference in their entirety.

TECHNICAL FIELD

Particular embodiments relate generally to wireless communications and more particularly to a system and method for aligning measurement cycle periods and discovery signals.

BACKGROUND

In a wireless network, a wireless device may communicate with one or more radio access nodes to send and/or receive information, such as voice traffic, data traffic, control signals, and so on. One method wireless network operators use to cope with the increasing number of mobile broadband data subscribers and bandwidth-intensive services competing for limited radio resources is to add small cells within their macro networks to spread traffic loads, maintain performance, and use spectrum efficiently.

Small cells comprise low-powered radio access nodes that can operate in licensed or unlicensed spectrum that have a range of approximately 10 meters to 1 or 2 kilometers. This range is "small" compared to a macrocell, which may have a range of a few tens of kilometers. Small cells may include, for example, femtocells, picocells, and microcells. Small-cell networks may also include distributed radio technology consisting of centralized baseband units and remote radio heads. Sometimes beamforming further enhances small cell coverage. Small cells are available for a range of radio interfaces including Global System for Mobile Communications (GSM), CDMA2000, TD-SCDMA, W-CDMA, Long Term revolution (LTE) and WiMax. In 3GPP terminology, a Home Node B (HNB) is a 3G femtocell. A Home eNode B (HeNB) is an LTE femtocell.

Efficient operation in densely deployed small cells relies on low interference between cells. A particular mechanism to reduce interference between cells is known as small cell on/off. Small cell on/off provides energy-efficient load balancing by turning off the low-power nodes when there is no ongoing demand for data transmission. More evolved Node Bs (eNBs) increases radio interference and network power consumption. Making nodes dormant can match available capacity to network traffic loading. Small cell on/off may also provide energy savings.

The particular on/off scheme in use, depending on its time scale, can have an impact on user equipment (UE) measurements. This is because the particular reference signals to be measured must be available during the measurement time period. To facilitate measurement on a cell, even when the cell is off a schedule for transmission of discovery signals must be coordinated. These discovery signals will be transmitted with a lower periodicity than reference signals that are usually transmitted when the cell is on.

For making measurements on currently used component carriers, measurement cycle lengths are configured for a UE. The measurement cycle configuration includes requirements on the measurements that must be made within the measurement cycle. To perform measurement on cells operating in carrier frequencies that are different from the ones that the receiver in the UE is currently tuned to, the network node schedules measurement gaps so that the UE can tune one or more of its receivers to other frequencies during the measurement gaps to make the measurements.

When small cell on/off is used on the cells in the current component carriers or used in other frequencies, the occurrence of discovery signals on these cells should occur often enough in the measurement cycle and should be aligned with the measurement gaps so that a signal is available for the UE to measure. A problem that arises with the low periodicity of discovery signals and the low periodicity of measurement gaps is that at a particular time all (or at least a large fraction) of UEs may be unavailable to send/receive data on the serving cell because they are scheduled to make measurements on the other cells that are transmitting discovery signals with low periodicities.

The measurement procedure adopted by a UE may depend on the type of information that the network provides to the UE. As a specific example, the measurement procedure may depend upon the particular reference signal that the UE is to measure. Under normal cell operation, the network node transmits the reference signals used for measurements periodically and also frequently. In particular examples, the network node may transmit reference signals in every subframe. In such an example, a UE measurement configuration for a deactivated secondary cell (SCell) can be determined using the SCell measurement cycle (i.e., measCycleSCell), which is configured by higher layers. Also, measurement gaps are provided for performing inter-frequency measurements. A radio network node refrains from scheduling a UE on the serving cell during these measurement gaps.

When small cell on/off is operated on serving component carriers or on cells operating in frequencies other than the current primary component carrier (PCC) and secondary component carriers (SCCs), coordination is necessary to ensure that the occurrence of discovery signals on these cells are aligned with the measurement cycle periods and measurement gaps so that a signal is available for the UE to measure. One problem that arises with the low periodicity of discovery signals and measurement gaps is that all (or a large fraction of) UEs may simultaneously not be available on the serving cell for sending data, which is undesirable. Another problem is when multiple frequencies use the same aligned subframes for discovery signal transmission, which significantly increases the time for a UE to make inter-frequency measurements because the UE has to tune its receiver sequentially to each frequency and measure the cells on the frequency before proceeding to the next one. Therefore, efficient solutions are needed that do not negatively impact measurement quality while also making enough UEs available for scheduling of data in the serving cells.

SUMMARY

According to some embodiments, a method in a network node of a wireless communication network for aligning discovery reference signal (DRS) occurrences comprises determining a first DRS occurrence configuration. The first DRS occurrence configuration comprises a schedule for transmission of a first series of DRS occurrences. The method further comprises determining a first discovery measurement timing configuration (DMTC). The first DMTC comprises a schedule for receiving DRS occurrences that is aligned with a first subset of DRS occurrences of the first series of DRS occurrences. The method further comprises determining a second DMTC. The second DMTC comprises a schedule for receiving DRS occurrences that is aligned with a second subset of DRS occurrences of the first series of DRS occurrences, wherein the second subset of DRS occurrences is different than the first subset of DRS occurrences. The method further comprises communicating the first DMTC to a first wireless device and communicating the second DMTC to a second wireless device.

In particular embodiments, the method comprises determining a second DRS occurrence configuration. The second DRS occurrence configuration comprises a schedule for transmission of a second series of DRS occurrences. The determined first DMTC comprises a schedule for receiving DRS occurrences that is aligned with a first subset of DRS occurrences of the second series of DRS occurrences.

In particular embodiments, the first DRS occurrence configuration is associated with a serving cell of the first wireless device, and the second DRS occurrence configuration is associated with a non-serving cell of the first wireless device. In particular embodiments, the first DRS occurrence configuration is associated with a first carrier frequency, and the second DRS occurrence configuration is associated with second carrier frequency.

According to some embodiments, a method in a network node of a wireless communication network for aligning DRS occurrences comprises determining a first DRS occurrence configuration. The first DRS occurrence configuration comprises a schedule for transmission of a first series of DRS occurrences. The method further comprises determining a first discontinuous reception (DRX) configuration. The first DRX configuration comprises a schedule of DRX cycles for a first wireless device. The method further comprises determining a first DMTC. The first DMTC comprises a schedule for receiving DRS occurrences that is aligned with a first subset of DRS occurrences of the first series of DRS occurrences and the schedule of DRX cycles for the first wireless device. The method further comprises communicating the first DMTC to the first wireless device.

In particular embodiments, the method comprises determining a second DRX configuration. The second DRX configuration comprises a schedule of DRX cycles for a second wireless device. The method further comprises determining a second DMTC. The second DMTC comprises a schedule for receiving DRS occurrences that is aligned with a first subset of DRS occurrences of the first series of DRS occurrences and the schedule of DRX cycles for the second wireless device. The method further comprises communicating the second DMTC to the second wireless device.

According to some embodiments, a network node comprises a processor operable to determine a first DRS occurrence configuration. The first DRS occurrence configuration comprises a schedule for transmission of a first series of DRS occurrences. The processor is further operable to determine a first DMTC. The first DMTC comprises a schedule for receiving DRS occurrences that is aligned with a first subset of DRS occurrences of the first series of DRS occurrences. The processor is further operable to determine a second DMTC. The second DMTC comprises a schedule for receiving DRS occurrences that is aligned with a second subset of DRS occurrences of the first series of DRS occurrences, wherein the second subset of DRS occurrences is different than the first subset of DRS occurrences. The processor is further operable to communicate the first DMTC to a first wireless device and communicate the second DMTC to a second wireless device.

According to some embodiments, a network node comprises a processor operable to determine a first DRS occurrence configuration. The first DRS occurrence configuration comprises a schedule for transmission of a first series of DRS occurrences. The processor is further operable to determine a first DRX configuration. The first DRX configuration comprises a schedule of DRX cycles for a first wireless device. The processor is further operable to determine a first DMTC. The first DMTC comprises a schedule for receiving DRS occurrences that is aligned with a first subset of DRS occurrences of the first series of DRS occurrences and the schedule of DRX cycles for the first wireless device. The processor is further operable to communicate the first DMTC to the first wireless device.

Particular embodiments may exhibit some of the following technical advantages. In particular embodiments, the systems and methods facilitate configuration of the timing of RRM measurements by wireless devices performed on discovery signals so that small cell on/off can be operated on the measured cells while ensuring that the network node has a wireless device available for scheduling on the serving cells. Another technical advantage may be that the systems and methods allow the use of a common measurement gap configuration to perform measurements on different carrier frequencies efficiently. Still another technical advantage may be that the systems and methods facilitate the flexible formation of multiple groups of wireless devices so that the occurrences of their measurement periods do not conflict with each other.

Some embodiments may benefit from some, none, or all of these advantages. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which:

FIG. 11 is a block diagram illustrating an example embodiment of a wireless device;

FIG. 12 is a block diagram illustrating an example embodiment of a radio network node.

DETAILED DESCRIPTION

In particular networks, when small cell on/off is operated on serving component carriers or on cells operating in frequencies other than the current PCC and SCCs, coordination is necessary to align the occurrence of these cells' discovery signals with the measurement cycle periods and measurement gaps for a UE. If all UEs are simultaneously scheduled to measure the low frequency and low periodicity discovery signals, then none of the UEs are available on the serving cell for sending data during that time. Another problem is that multiple frequencies using the same aligned subframes for discovery signal transmission can significantly increase the time for a UE to make inter-frequency measurements because the UE has to tune its receiver sequentially to each frequency and measure the cells on the frequency before proceeding to the next one.

An object of the present disclosure is to obviate at least the disadvantages above and provide an improved method of aligning DRS occurrences. Particular embodiments are described with reference to FIGS. 1-13 of the drawings, like numerals being used for like and corresponding parts of the various drawings. LTE is used throughout this disclosure as an example cellular system, but the ideas presented herein apply to other wireless communication systems as well.

Figure 1:
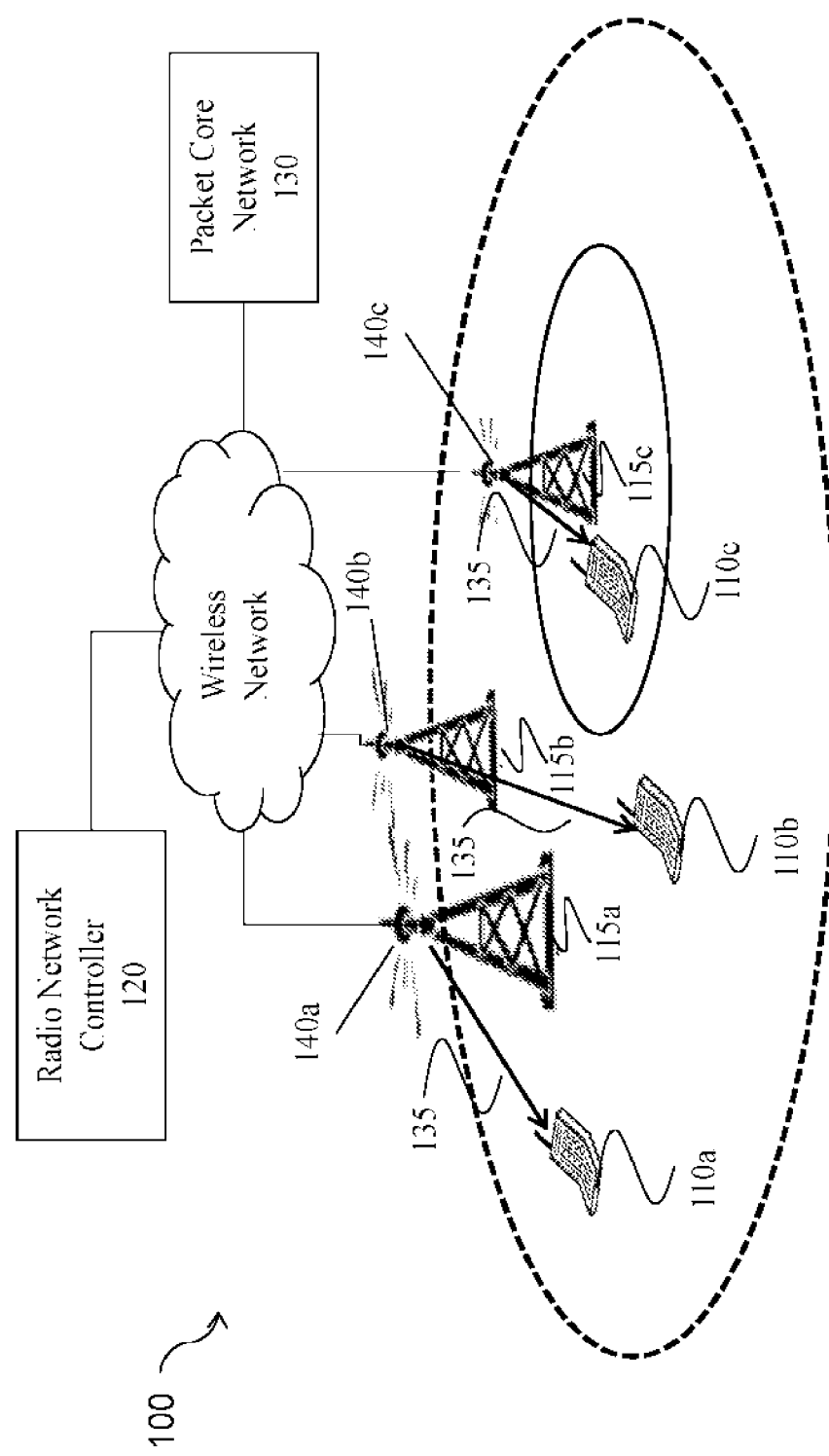
FIG. 1 is a block diagram illustrating an example of a wireless radio network, according to a particular embodiment.

FIG. 1 is a block diagram illustrating an example of a wireless radio network, according to a particular embodiment. Network 100 includes radio network nodes 115 (such as a base station or eNodeB) and wireless devices 110 (such as mobile phones, smart phones, laptop computers, tablet computers, or any other devices that can provide wireless communication. In general, wireless devices 110 that are within coverage of radio network node 115 communicate with radio network node 115 by transmitting and receiving wireless signals 135. For example, wireless devices 110 and radio network node 115 may communicate wireless signals 135 containing voice traffic, data traffic, and/or control signals.

Figure 3:
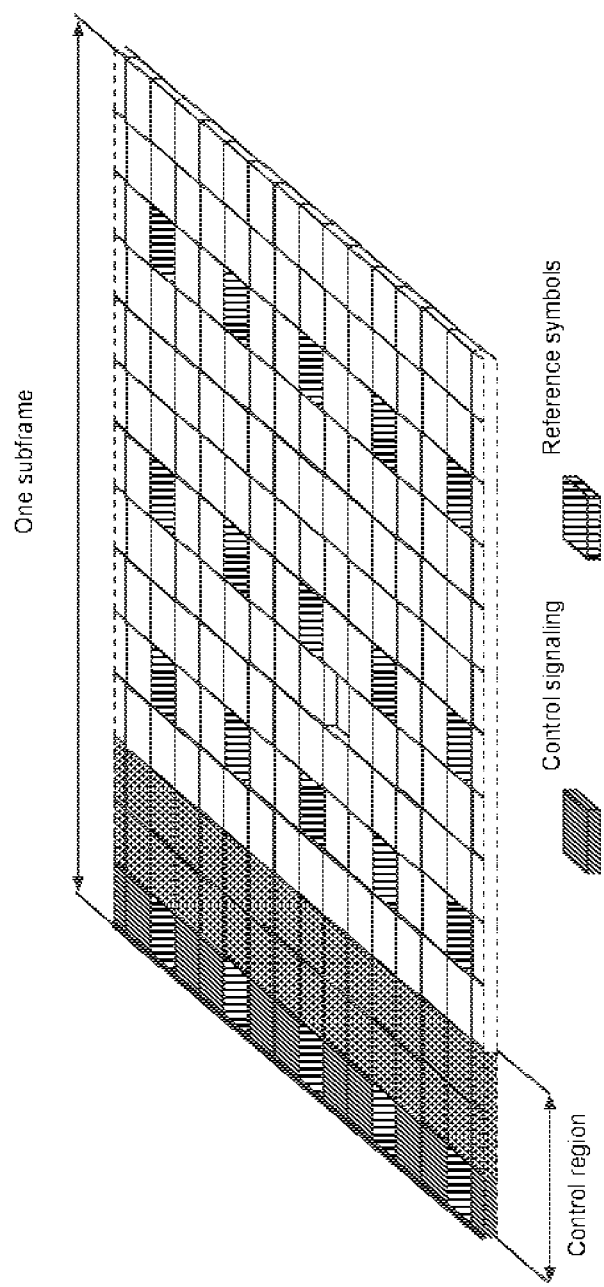
FIG. 3 is a diagram depicting an example downlink subframe, in accordance with a 3GPP specification.
Figure 4:
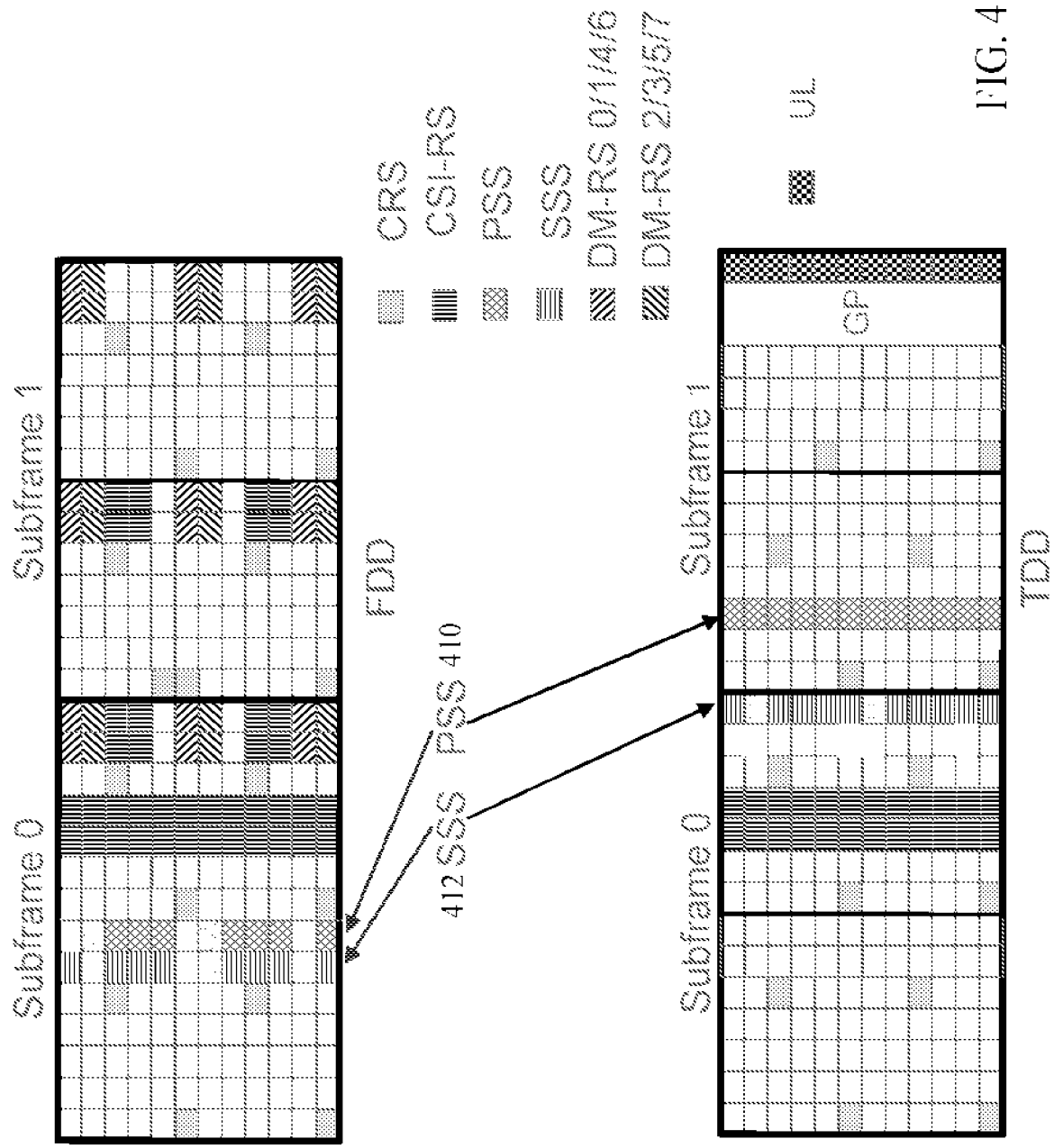
FIG. 4 is a diagram depicting example reference signals over two subframes of a duration of 1 ms each, according to some embodiments.

Wireless signals 135 may include both downlink transmissions (from radio network node 115 to wireless devices 110) and uplink transmissions (from wireless devices 110 to radio network node 115). Wireless signals 135 may include discovery signals. Discovery signals may include, for example, reference signals used for performing Radio Resource Management (RRM) measurements. Discovery signals may also include, for example, synchronization signals such Primary Synchronization Signals (PSS) and Secondary Synchronization Signals (SSS). Wireless device 110 may detect the synchronization signals to determine system information for network 100. Any of these signals or any group of these signals may be referred to as discovery reference signals (DRS). Wireless signals 135 comprise radio frames. Particular example formats for these radio frames are illustrated in FIGS. 3 and 4 described below.

Radio network node 115 transmits and receives wireless signals 135 using antenna 140. In particular embodiments, radio network node 115 may comprise multiple antennas 140. For example, radio network node 115 may comprise a multi-input multi-output (MIMO) system with two, four, or eight antennas 140.

Radio network node 115 may interface with radio network controller 120. Radio network controller 120 may control radio network node 115 and may provide certain radio resource management functions, mobility management functions, and/or other suitable functions. For example, radio network controller 120 may facilitate a communication session for wireless device 110 in soft handover with an active set of cells. The active set may include a serving cell and one or more non-serving cells.

Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionality for wireless device 110. Wireless device 110 may exchange certain signals with core network node 130 using the non-access stratum layer. In non-access stratum signaling, signals between wireless device 110 and core network node 130 may be transparently passed through the radio access network.

In network 100, each radio network node 115 may use any suitable radio access technology, such as LTE, LTE-Advanced, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 11 below. Similarly, a radio network node may include any suitable combination of hardware and/or software. For example, in particular embodiments, a radio network node, such as radio network node 115, may include the components described with respect to FIG. 12 below.

3GPP LTE technology is a mobile broadband wireless communication technology in which transmissions from radio network nodes 115, which may include base stations such as those referred to as eNBs in particular embodiments, to wireless devices 110, which may also be referred to as user equipment (UE), are sent using orthogonal frequency division multiplexing (OFDM). OFDM splits the signal into multiple parallel sub-carriers in frequency. The basic unit of transmission in LTE is a resource block (RB), which in its most common configuration consists of 12 subcarriers and 7 OFDM symbols (one slot). A unit of one subcarrier and 1 OFDM symbol is referred to as a resource element (RE).

Figure 2:
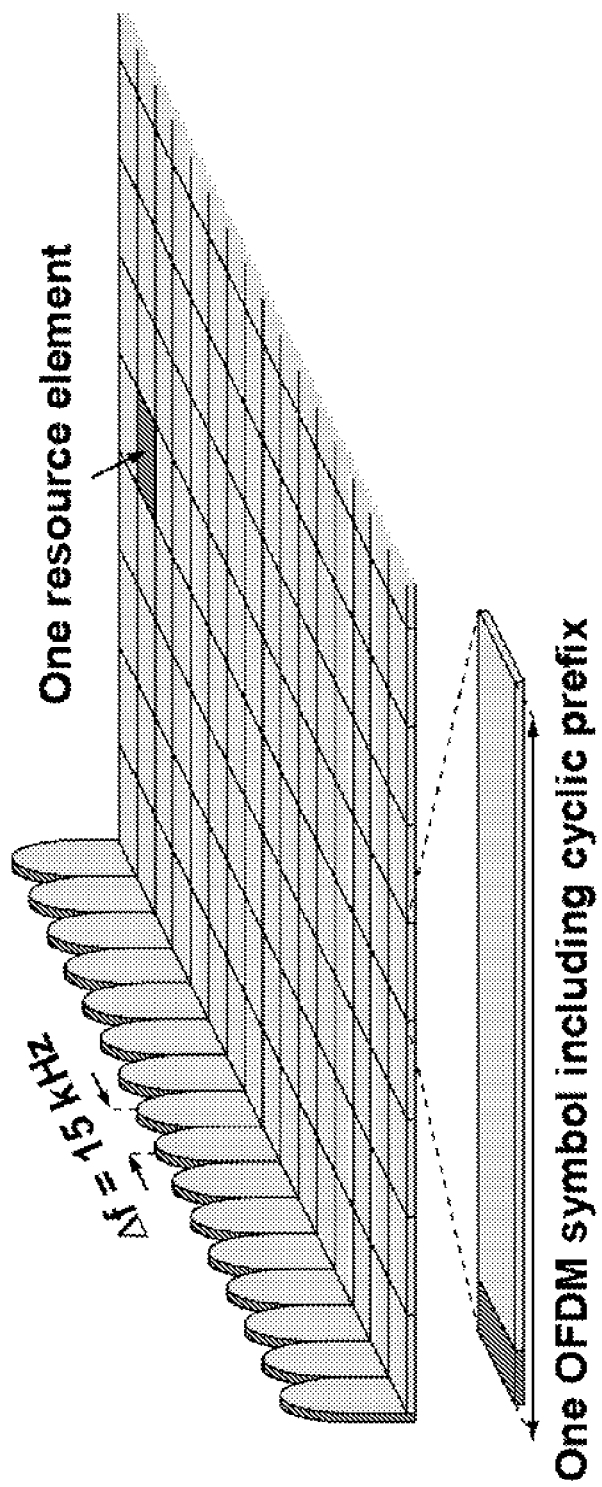
FIG. 2 is a diagram depicting example LTE downlink physical resources, in accordance with a 3GPP specification.

FIG. 2 is a diagram depicting example LTE downlink physical resources, in accordance with a 3GPP specification. In the illustrated example, a resource block comprises 84 resource elements. An LTE radio subframe comprises two slots in time and multiple resource blocks in frequency. The number of resource blocks determines the bandwidth of the system.

FIG. 3 is a diagram depicting an example downlink subframe, in accordance with a 3GPP specification. In the illustrated example, the two resource blocks in a subframe that are adjacent in time may be denoted as a resource block pair (RB pair). Currently, LTE supports standard bandwidth sizes of 6, 15, 25, 50, 75 and 100 RB pairs. In the time domain, LTE downlink transmissions may be organized into radio frames of 10 ms. Each radio frame comprises ten equally-sized subframes of length Tsubframe=1 ms.

Radio network node 115 may transmit wireless signal 135 in a downlink (the link carrying transmissions from the eNB to the UE) subframe from multiple antennas 140. Wireless device 100 may receive wireless signal 135 via multiple antennas of its own. The radio channel may distort the transmitted signals from multiple antenna ports 140. To demodulate transmissions on the downlink, wireless device 110 relies on reference symbols (RS) that it receives on the downlink. Reference signals may be used to measure the channel between the transmitter and the receiver antenna.

LTE specifications refer to logical antenna ports (AP). Each reference symbol is associated with an antenna port. When wireless device 110 measures a channel using the reference symbol, this may be referred to as wireless device 110 measuring the channel from a particular antenna port (to the receiver antenna). The particular transmitter implementation determines how to transmit the reference symbol when multiple physical antennas at the transmitter transmit the reference symbol for a single logical antenna port. The mapping of a reference symbol to multiple physical antennas may be referred to as antenna virtualization. This visualization operation is transparent to wireless device 110 because wireless device 110 only measures the channel on the given reference symbol (i.e., the antenna port).

Reference symbols and their position in the time-frequency grid are known to wireless device 110 and hence may be used to synchronize to the downlink signal and determine channel estimates by measuring the effect of the radio channel on these symbols Rel-11 and prior releases of LTE include multiple types of reference symbols. The common reference symbols (CRS), corresponding to antenna ports 0-3, may be used for channel estimation during demodulation of control and data messages in addition to synchronization. The CRS are present in every subframe. The channel state information reference symbols (CSI-RS), corresponding to antenna ports 15-22, are used for channel state feedback related to the use of transmission modes that enable UE-specific antenna precoding. These transmission modes use the UE-specific demodulation reference symbols (DM-RS), corresponding to antenna ports 7-14, at the time of transmission with the precoding at radio network node 115 performed based on the feedback received from and measured by wireless device 110 on the CSI-RS.

The primary synchronization signal (PSS) and the secondary synchronization signal (SSS) are used for cell search and coarse time and frequency synchronization. These signals are strictly not reference signals but synchronization signals and hence do not correspond to any numbered antenna port in the LTE specifications.

FIG. 4 is a diagram depicting example reference signals over two subframes of a duration of 1 ms each, according to some embodiments. The CSI-RS are modulated using a sequence that depends on a configurable cell identifier (ID) that can be different from the cell ID being used in the cell.

PSS 410 and SSS 412 define the cell ID of the cell. According to 3GPP specifications, SSS 412 may represent 168 different cell ID groups. PSS 410 may represent three values that determine the cell ID within a group. Thus, the total number of cell IDs is 504 (168*3).

PSS 410 are Zadoff-Chu sequences of length 63 which, along with five zeros appended on each edge, occupy the 73 subcarriers in the central six resource blocks. SSS 412 are two m-sequences of length 31 that occupy alternate resource elements and are appended with five zeros on each edge and located in the central six resource blocks (similar to PSS 410). PSS 410 and SSS 412 sequences occur in subframes 0 and 5. PSS 410 is the same in both subframe 0 and subframe 5, while SSS 412 sequences differ between the subframes. The sequence transmitted in subframe 0 may be referred to as SSS1 and the sequence transmitted in subframe 5 may be referred to as SSS2. The SSS2 sequence swaps the two length-31 m-sequences transmitted as part of sequence SSS1 in subframe 0.

One mechanism for interference avoidance and coordination among small cells is the small cell on/off feature. According to this feature, the small cell may be turned on and off as needed. Each of the on and off periods may depend on particular criteria or applications associated with the particular small cell. Another purpose of small cell on/off can be for energy saving.

Referring back to FIG. 1, as a particular example, radio network node 115c may represent a radio network node of a small cell within a macro cell served by radio network node 115a. According to the small cell on/off feature described in LTE Rel-12, radio network node 115c may be off for long periods of time. In this example, a discovery signal may assist wireless device 110 with measurements. The discovery signal supports the properties required for enabling RRM measurements, RLM related procedures and coarse time/frequency synchronization. To facilitate the UE measurements, radio network node 115c wakes up periodically (e.g., once every 80 ms, 160 ms, etc.) and sends the discovery signal so that wireless device 110 may use it for mobility related operations such as cell identification, RLM, and measurement.

A single cell may include multiple transmission points that may transmit the downlink signal. An example is a distributed antenna system (DAS) that uses multiple radio remote heads that are physically dislocated within the cell to transmit signals that all belong to the same cell (i.e., same CellID). The term transmission point may also refer to a sector of a site where the different sectors of the same site then constitute different transmission points. The discovery signal may also be capable of identifying individual transmission points and enabling RRM measurements for the transmission points.

3GPP specifics that the discovery signals will contain at least the PSS, SSS, and CRS. The CSI-RS may optionally be present when configured. The discovery signal may be transmitted at least with the periodicities of 40, 80, or 160 ms. The duration of the discovery signal may be 5 subframes or less.

Discovery signal parameters may include (1) a duration of each occasion when discovery signal is transmitted (referred to as the DRS occasion), (2) a periodicity of the occurrence of the DRS occasion, and (3) timing (in terms of a start time or an offset from a reference point such as a particular frame and subframe number) of the DRS occasion. Radio network node 115 may communicate these discovery signal parameters to wireless device 110 to facilitate wireless device 110 to make measurements. These parameters may be referred to as the discovery measurement timing con figuration (DMTC). In addition to the timing, periodicity, and duration of the DRS occasion, the DMTC may indicate to wireless device 110 which subframes wireless device 110 may use to measure the discovery signal.

Wireless device 100 may perform measurements on the serving or on neighbor cells over some known reference symbols or pilot sequences. Wireless device 100 may perform measurements on cells on an intra-frequency carrier, inter-frequency carrier(s), or inter-RAT carriers(s) (depending upon the capabilities of wireless device 110 and whether it supports a particular RAT).

In multi-carrier or carrier aggregation (CA) network, wireless device 110 may perform measurements on the cells on the primary component carrier (PCC) as well as on the cells on one or more secondary component carriers (SCCs). Wireless device 110 may perform RRM measurements on other frequencies that are different from any of the currently used component carriers.

Examples of measurements in LTE include cell identification, reference symbol received power (RSRP), and reference symbol received quality (RSRQ). Other properties may be derived from the reference signal, such as Quasi Co-Location (QCL), coarse time and frequency synchronization, channel state information (CSI), reference signal time difference (RSTD) measurements, fine time and frequency synchronization for demodulation purposes, etc.

Wireless device 110 may use its radio measurements for one or more radio operational tasks. One example task is reporting the measurements to the network, which in turn may use them for various tasks. As a particular example, in RRC connected state wireless device 110 reports radio measurements to radio network node 115. In response to the reported wireless device measurements, the serving network may determine to send a cell change mobility command to wireless device 110. Examples of cell change include handover, RRC connection re-establishment, RRC connection release with redirection, PCell change in CA, PCC change in PCC, etc. In idle or low activity state, an example of cell change is cell reselection. In another example, wireless device 110 may itself use the radio measurements for performing tasks, e.g. cell selection, cell reselection, etc.

In particular embodiments, the PSS, SSS and CRS may be used for performing radio resource management (RRM) measurements on the serving and other frequencies. LTE Rel-12 permits optional use of CSI-RS at least for RSRP measurements.

To facilitate inter-frequency measurements, measurement gaps may be configured for wireless device 110 so that wireless device 110 can use the gaps to tune one or more of its receivers to other frequencies to measure on those frequencies. Wireless device 110 may be unavailable for any transmission of data on the serving cell during these measurement gaps.

In multicarrier or carrier aggregation (CA) operation, wireless device 110 is able to receive and/or transmit data to more than one serving cell. That is, a CA-capable wireless device 110 may be configured to operate with more than one serving cell. The carrier of each serving cell is generally referred to as a component carrier (CC). The component carrier may refer to an individual carrier in a multi-carrier system. Carrier aggregation may also be referred to as (e.g., interchangeably called) "multi-carrier system," "multi-cell operation," "multi-carrier operation," or "multi-carrier" transmission and/or reception. Carrier aggregation may be used for transmission of signaling and data in the uplink and downlink directions. One component carrier may operate as the primary component carrier (PCC). The PCC may also be referred to simply as the primary carrier or the anchor carrier. Remaining component carriers may be referred to as secondary component carriers (SCCs) or simply secondary carriers or supplementary carriers. The serving cell may interchangeably be referred to as the primary cell (PCell) or primary serving cell (PSC). Similarly, the secondary serving cell may interchangeably be referred to as the secondary cell (SCell) or secondary serving cell (SSC).

Generally, the primary or anchor component carrier carries the essential wireless device specific signaling. For carrier aggregation, the PCC exists in both uplink and downlink directions. When a single uplink component carrier is used, that component carrier is a component carrier of the PCell. The network may assign different primary carriers to different wireless devices 110 operating in the same sector or cell.

A serving radio network node 115 (e.g., eNode B in LTE) may use a configuration procedure to configure a CA-capable wireless device 110 with one or more SCells (e.g., downlink SCell, uplink SCell, or both). A serving radio network node 115 may use a de-configuration procedure to de-configure or remove one or more already configured SCells (e.g., downlink SCell, uplink SCell, or both). The configuration or de-configuration procedures may also change the current multi-carrier configuration, for example, by increasing or decreasing the number of SCells or for swapping the existing SCells with new ones. Radio network node 115 may perform the configuration and de-configuration in an LTE-specific embodiment.

In certain embodiments, serving radio network node 115 (e.g., eNode B in LTE) may activate one or more deactivated SCells or deactivate one or more SCells on the corresponding configured secondary carriers. The PCell may always be activated. The configured SCells may initially be deactivated upon addition and after a cell change (e.g., handover). In LTE, radio network node 115 may send an activation or deactivation command via MAC control element (MAC-$^4$CE). The deactivation of SCell saves battery power within wireless device 110. In Rel-12, when an SCell is operating small cell on/off and the SCell is deactivated, no signals may be transmitted on the SCell except for discovery signals.

Wireless device 110 may perform measurements on a deactivated SCell, on other cells on the SCC with deactivated SCell, or on other frequencies where an SCell has been deactivated. Wireless device 110 performs the measurements on one or more deactivated SCells of an SCC according to the SCell measurement cycle (i.e., measCycleSCell), which is configured by higher layers. The measurement cycles may have periodicity of 160, 256, 320, or 512 subframes, in particular embodiments. The maximum time of a measurement within each cycle is currently not restricted by 3GPP standard, but in practice it may likely be up to six subframes in each cycle. When a UE measures on other frequencies, it uses measurement gaps to tune its receiver to another frequency and measure on cells using that frequency.

As described above, current 3GPP standards specify requirements for interruptions on a PCell when wireless device 110 performs measurements on an SCC with a deactivated SCell. For example, when DRX is not in use wireless device 110 should be able to identify a new detectable frequency division duplex (FDD) or time division duplex (TDD) cell on the secondary component carrier within Tidentify_sec, according to the parameter measCycleSCell where $T_{identify\_sec}$=20 measCycleSCell.

The measurement period for deactivated SCell measurements is $T_{measure\_sec}$ according to the parameter measCycleSCell where $T_{measure\_sec}$=5 measCycleSCell. In particular embodiments, wireless device 110 may be capable of performing RSRP and RSRQ measurements for eight identified cells on the secondary component carrier, and the UE physical layer should be capable of reporting measurements to higher layers with the measurement period of $T_{measure\_sec}$.

In various embodiments, wireless device 110 may adopt a measurement procedure based on the type of information that the network provides to wireless device 110. As a particular example, the measurement procedure may depend upon the reference signal that wireless device 110 is intending to use for measurement. Under normal cell operation, network node 115 transmits the measurement reference signals periodically and frequently. In certain embodiments, for example, network node 115 may transmit the reference signals in every subframe. Wireless device 110 measurement behavior on a deactivated SCell may be determined using the SCell measurement cycle (i.e. measCycleSCell), which is configured by higher layers. Also, measurement gaps are provided for performing inter-frequency measurements Radio network node 115 refrains from scheduling wireless device 110 on the serving cell during the measurement gaps.

When small cell on/off is used with serving component carriers or on cells operating in frequencies other than the current PCC and SCCs, the discovery signal occurrences on these cells may be aligned with the measurement cycle periods and measurement gaps so that a signal is available for wireless device 110 to measure. The low periodicity of discovery signals and measurement gaps can lead to the undesirable situation where all (or a large fraction) of wireless devices 110 may simultaneously be unavailable on the serving cell for sending data. Another problem is that if multiple frequencies use the same aligned subframes for discovery signal transmission, then wireless device 110 may take a long time to make inter-frequency measurements because it has to tune its receiver sequentially to each frequency and measure the cells on that frequency before proceeding to the next one. The example embodiments described herein provide efficient solutions such that measurement quality is not compromised and that enough UEs are available for scheduling of data in the serving cells at any particular time.

The example methods described below provide for the configuration of the discovery signals in a network and for the configuration of measurement cycles and measurement gaps in wireless devices 110 so that RRM measurements may be performed more efficiently. Particular embodiments include configuring discovery signal occasions and discovery measurement timing configurations (DMTC) with different periodicities so that different groups of UEs may use different subsets of the discovery signal occasions for making measurements while the UEs not making measurements can be available for scheduling on the serving cells. Particular embodiments include configuring multiple discovery signal occasions that are aligned with the corresponding DMTC on a cell so that different groups of UEs can use different discovery signal occasions for making measurements. Particular embodiments include partitioning UEs into multiple groups with each group configured to have a DMTC or measurement gap at a different time so that at least one group of UEs is available for the eNB to schedule data at any given time. Particular embodiments include staggering of discovery signal occasions for different carrier frequencies so that they are not aligned with each other, but are aligned with a single measurement gap configuration for a UE, so that a UE can use the single measurement gap configuration to make measurement on cells configured on multiple carrier frequencies. Particular embodiments include configuring DRX cycles to ensure that their alignment with measurement timing and discovery signals allows efficient operation of the system without compromising UE throughput and delay performance and energy consumption.

Particular embodiments may be described with emphasis on single carrier operation of the wireless device 110. The embodiments are also applicable, however, to multi-carrier or carrier aggregation operation of wireless device 110. The methods of signaling information to wireless device 110 or to the other network nodes may be carried out independently for each cell on each carrier frequency supported by network node 115.

The following embodiments illustrate particular examples. These embodiments are not mutually exclusive. Components of one embodiment may be tacitly assumed to be present in another embodiment and it will be obvious to a person skilled in the art how those components may be used in the other exemplary embodiments.

When wireless device 110 is configured and is requested to measure on one or more cells on the first SCC, wireless device 110 is signaled by the higher layer the SCell measurement cycle (denoted by Sc). This could, for example, be the case when the configuration of wireless device 110 includes at least one deactivated SCell on the first SCC. However, if the network is transmitting a discovery signal to wireless device 110, then wireless device 110 should use the discovery signal for making measurements. Wireless device 110 may acquire from the network the occasion of the occurrence of the discovery signal. The periodicity of the discovery signal (denoted by Dp), however, may be such that wireless device 110 does not necessarily receive the discovery signal at the SCell measurement cycle more than once (e.g., if the discovery signal periodicity is 160 ms). Thus, for intra-frequency measurements on this carrier frequency, all wireless devices 110 would need to perform measurements during the same duration which could make them unavailable for data scheduling on the serving cell. Similarly, when making inter-frequency measurements, if the discovery signal is only available at periodicities that overlap with a single measurement gap configuration, all wireless devices 110 may make inter-frequency measurements at the same time, thus making them unavailable for data scheduling on the serving cell. The following example embodiments describe methods to configure network transmissions of discovery signals and wireless device measurements to prevent such limitations.

In particular embodiments, wireless device 110 may determine to make measurements on cells of a SCC that is operating on/off and for which discovery signal occasion parameters, such as periodicity, timing and duration have been signaled. In particular embodiments, wireless device 110 may be configured with more than one SCC (e.g., first SCC and second SCC). In particular embodiments, wireless device 100 may perform inter-frequency RRM measurements for frequencies other than those configured as component carriers. Wireless device 110 may use configured measurement gaps to measure cells on the other carrier frequencies.

Figure 5:
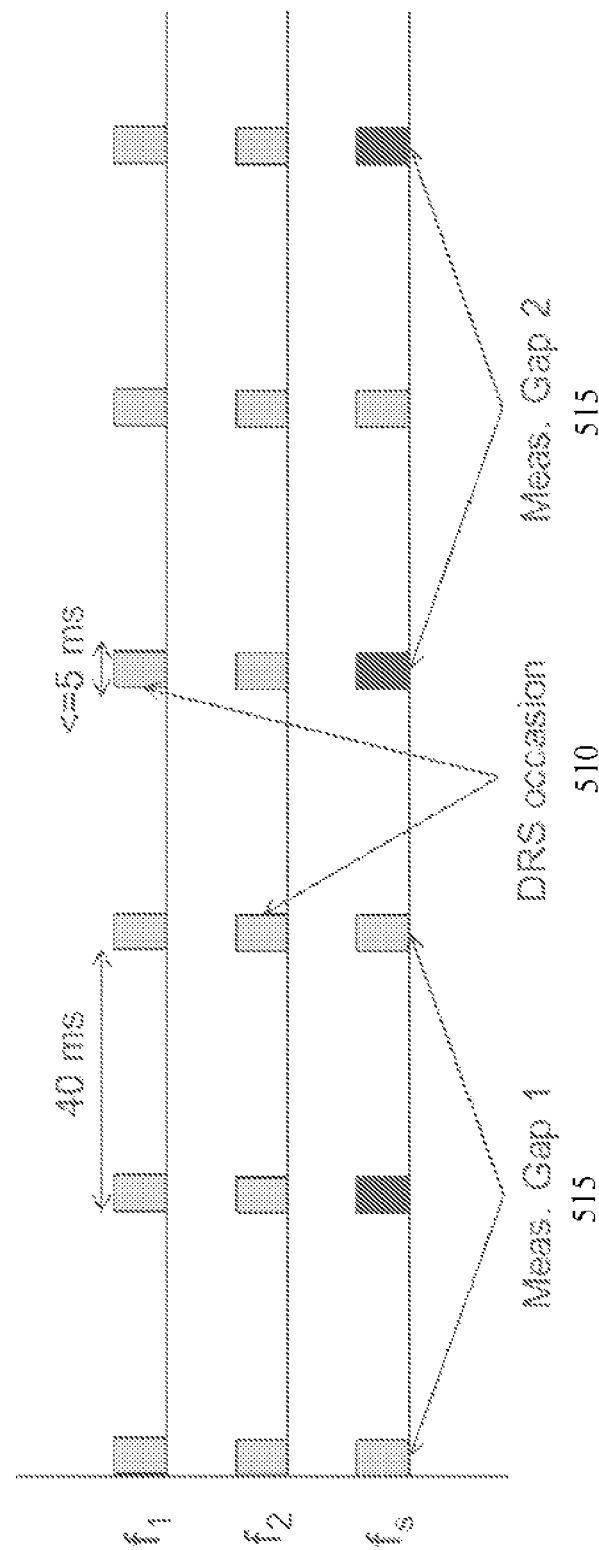
FIG. 5 illustrates an example scenario wherein discovery signal occasions occur with greater periodicity than the measurement timing configurations and measurement gaps, according to particular embodiments.

FIG. 5 illustrates an example scenario wherein discovery signal occasions occur with greater periodicity than the measurement timing configurations and measurement gaps, according to particular embodiments. For example, radio network node 115 may transmit a discovery signal with a periodicity that is greater than the indicated measurement timing configuration. Horizontal lines $f_1$, $f_2$, and $f_3$ represent three carrier frequencies. The illustrated embodiment includes a plurality of DRS occasions 510 for each carrier frequency $f_1$, $f_2$, and $f_3$. Two measurement gaps 515 are illustrated. The periodicity of the discovery signal on all carrier frequencies is 40 ms. Although three carrier frequencies and two measurement gaps are illustrated, particular embodiments may apply to any number of carrier frequencies and measurement gaps 515. In particular embodiments, each carrier frequency may represent a group of carrier frequencies that share the same configuration.

In particular embodiments, radio network node 115 may signal the true periodicity (e.g., 40 ms) to wireless device 110. The DMTC that radio network node 115 signals to wireless device 110, however, may signal a timing configuration with a periodicity of 80 ms and an offset that may depend on the membership of wireless device 110 in a particular group. Particular embodiments may use any suitable periodicity and offset. In the illustrated example, wireless devices 110 are partitioned into two groups. The offset of the DRS occasion indicated for the first and second groups is 0 and 40 respectively. For inter-frequency measurements, wireless devices 110 are also configured with measurement gaps 515 of periodicity 80 ms that are aligned with the signaled DMTC.

In particular embodiments, wireless device 110 may use the measurement timing configuration (in the aligned measurement gaps) to perform inter-frequency measurements. To perform intra-frequency measurements, wireless device 110 may use the measurement timing configuration to measure other cells. However, when wireless device 110 is in DRX and it is not necessary for it to monitor the PDCCH during the reception duration of a DRS burst that is not part of its DMTC, wireless device 110 may optionally receive the DRS and perform measurements on it.

In particular embodiments, DRS occasions 510 may be evenly spaced with the same periodicity as the measurement timing configurations. In such an embodiment, the resulting transmissions from radio network node 115 are the same as in FIG. 5, although the signaling of DRS occasions 510 is different. Here, DRS occasions 510 may be signaled as having periodicities of 80 ms, but radio network node 115 may transmit two sets of DRS occasions 510 that are offset by 40 ms. Therefore, for a group of wireless devices 110 that are configured with measurement gap 1 and DMTC 1, the radio network node may signal a DRS occasion 510 with a periodicity of 80 ms starting at subframe 0. Thus, these DRS occasions 510 may occupy a duration of 5 ms or less starting at subframes 0, 80, 160 and so on. Radio network node 115 may also signal a DRS occasion with a periodicity of 80 ms but with an offset of 40 ms to the group of wireless devices 110 that are configured with measurement gap 2 and DMTC 2. Measurement gaps 1 and DMTC 1 are aligned as is the case for measurement gaps 2 and DMTC 2.

In another variation of this embodiment, the DMTC may not be signaled at all if it is aligned with the signaled DRS occasions 510. DRS occasion 510 and the DMTC signaled to wireless device 110 for the serving frequency and the non-serving frequencies would be different so that wireless device 110 may perform measurements on the serving frequency at different times than the non-serving carrier frequencies. Thus, wireless device 110 may be signaled a DRS occasion 510 and DMTC aligned with measurement gap 1 for the non-serving carrier frequencies, and be signaled with a DRS occasion 510 and DMTC aligned with measurement gap 2 for the serving frequency.

In certain embodiments, wireless device 110 may perform measurements according to an intersection of the signaled measurement gaps and DRS occasions 510 (i.e., the gaps and occasions are aligned). This may apply to both inter-frequency and intra-frequency measurements, because wireless device 110 is not aware of the presence of any discovery signal bursts offset by 40 ms from the timing signaled to it, even though these DRS bursts are being transmitted.

Figure 6:
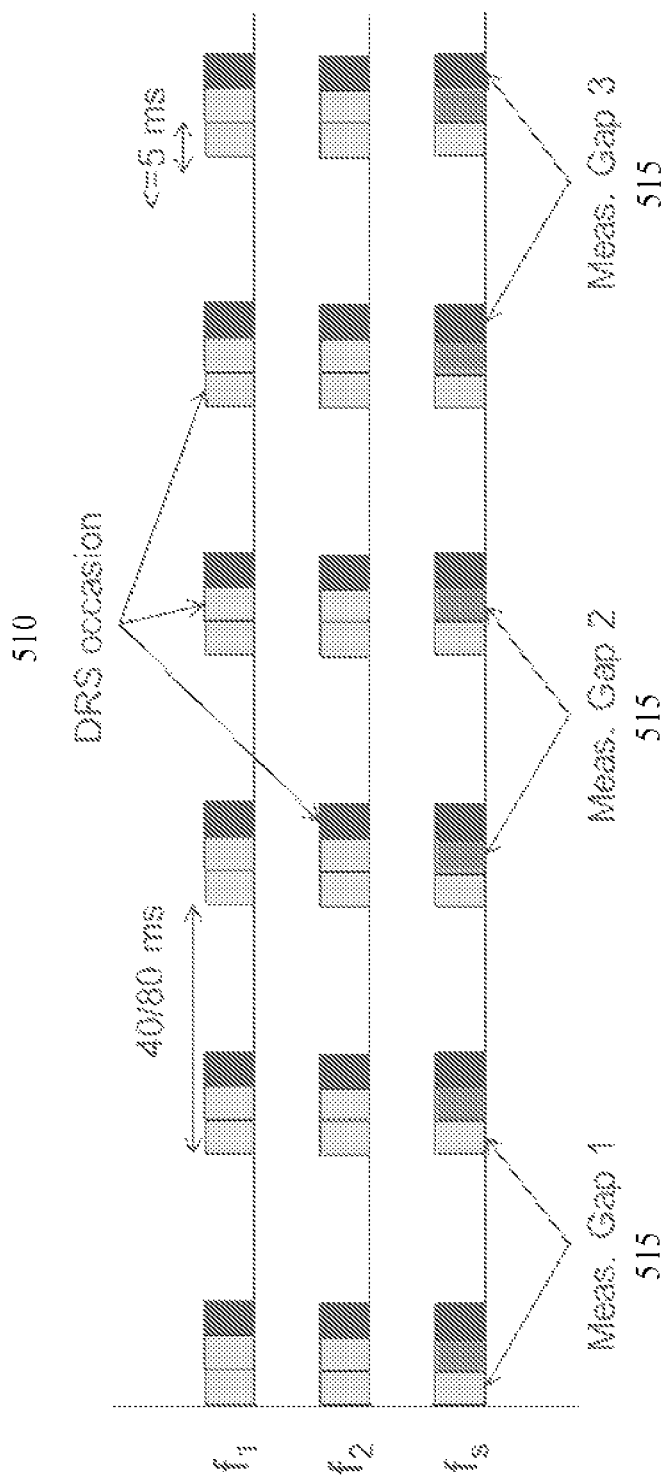
FIG. 6 illustrates an example scenario wherein the DRS occasions are not evenly spaced, according to particular embodiments.

FIG. 6 illustrates an example scenario wherein the DRS occasions are not evenly spaced, according to particular embodiments. For example, DRS occasions 510 may be non-evenly spaced with the same periodicity as the measurement timing configurations. In such an embodiment, multiple DRS occasions are used as in the previous embodiment. Horizontal lines $f_1$, $f_2$, and $f_3$ represent three carrier frequencies. The illustrated embodiment includes a plurality of DRS occasions 510 for each carrier frequency $f_1$, $f_2$, and $f_3$. Three measurement gaps 515 are illustrated. The periodicity of the discovery signal on all carrier frequencies may be 40 ms or 80 ms. Particular embodiments may use any suitable periodicity and offset. Although three carrier frequencies and three measurement gaps are illustrated, particular embodiments may apply to any number of carrier frequencies and measurement gaps 515. In particular embodiments, each carrier frequency may represent a group of carrier frequencies that share the same configuration.

In particular embodiments, DRS occasions 510 and measurement gaps 515 (and DMTCs if signaled) are aligned with different groups of wireless devices 110 being assigned different measurement gaps 515. Each group of wireless devices 110 is not aware of the DRS burst transmissions in the other occasions. Hence, only the DRS occasions 510 that have been signaled or the DMTC configurations that have been signaled (if they are signaled) are used both for inter-frequency and intra-frequency measurements. Wireless devices 110 may be grouped into any suitable number of groups with any suitable number of devices per group.

In particular embodiments, DRS occasions 510 and DMTCs may be signaled with different timings for the serving and non-serving carrier frequencies. An advantage is that the number of groups may be increased more flexibly because the periodicities of DRS occasions 510 are not restricted to be a multiple of the offsets between multiple DRS occasions 510. Therefore, as illustrated in the example embodiment, three groups of wireless devices 110 may be accommodated at the cost of increased overhead in transmissions and consequently reduced interference reduction and energy savings. The number of groups of wireless devices may be flexibly determined and configured based on the load in the network and features of the deployment.

Figure 7:
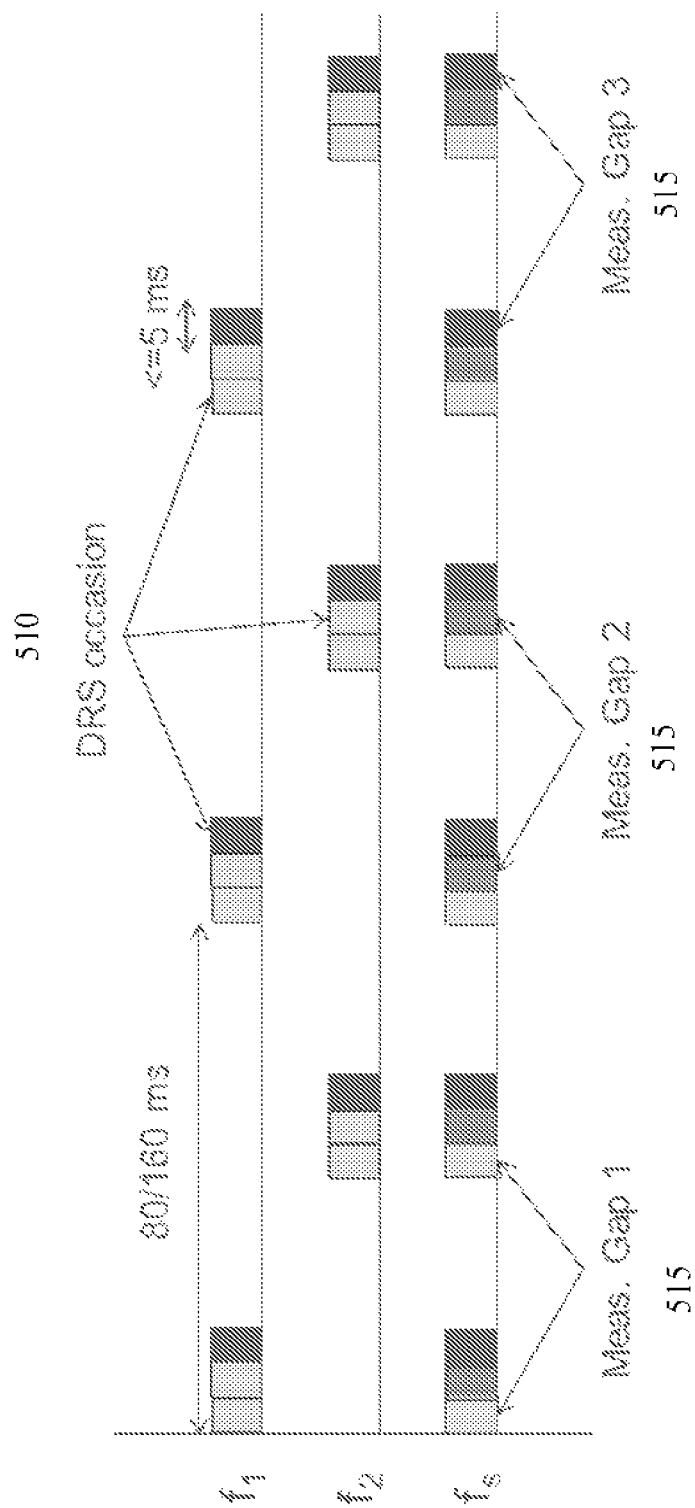
FIG. 7 illustrates an example measurement procedure wherein DRS occasions are offset between different carrier frequencies, according to particular embodiments.

FIG. 7 illustrates an example measurement procedure wherein DRS occasions are offset between different carrier frequencies, according to particular embodiments. For example, DRS occasions 510 may be offset between different carrier frequencies. Horizontal lines $f_1$, $f_2$, and $f_3$ represent three carrier frequencies. The illustrated embodiment includes a plurality of DRS occasions 510 for each carrier frequency $f_1$, $f_2$, and $f_3$. Three measurement gaps 515 are illustrated. Although three carrier frequencies and three measurement gaps are illustrated, particular embodiments may apply to any number of carrier frequencies and measurement gaps 515. In particular embodiments, each carrier frequency may represent a group of carrier frequencies that share the same configuration.

In particular embodiments, DRS occasions 510 on different carrier frequencies are offset so that the union of DRS occasions 510 on all the frequencies fit with the measurement gap 515 pattern of any wireless device 110. As a particular example, three groups of wireless devices 110 are depicted having measurement gaps 515 (or DMTCs if configured) with a periodicity of 40 or 80 ms. DRS occasions 510 on each cell occur only with a periodicity of 80 or 160 ms. The cells on carrier frequency f1 share the same DRS occasions 510 which are offset by a factor of 40 or 80 ms as compared to the cells from carrier frequency f2. This facilitates a wireless device 110 in any of the measurement groups to perform measurements on cells in either of the carrier frequencies. Particular embodiments may use any suitable periodicity and offset.

Even though FIG. 7 illustrates three carrier frequencies, it is generally recognized that each can represent a carrier frequency group. For example, one group of carrier frequencies can share the DRS occasion timing shown in the figure for frequency f1 while another group of carrier frequencies can share the timing for frequency f2. Particular embodiments may include four carrier frequency groups with each group having a DRS occasion 510 periodicity of 160 ms and being offset from other groups by 40, 80 or 120 ms while the UE measurement gap and DMTC periodicity may be 40 ms.

As described herein, DRS cycles for wireless device 110 may be aligned with measurement timing and discovery signals to facilitate efficient operation of the system without compromising wireless device throughput, delay performance, and energy consumption. Particular embodiments may align DRX cycles with measurement timing and discovery signals.

Figure 8:
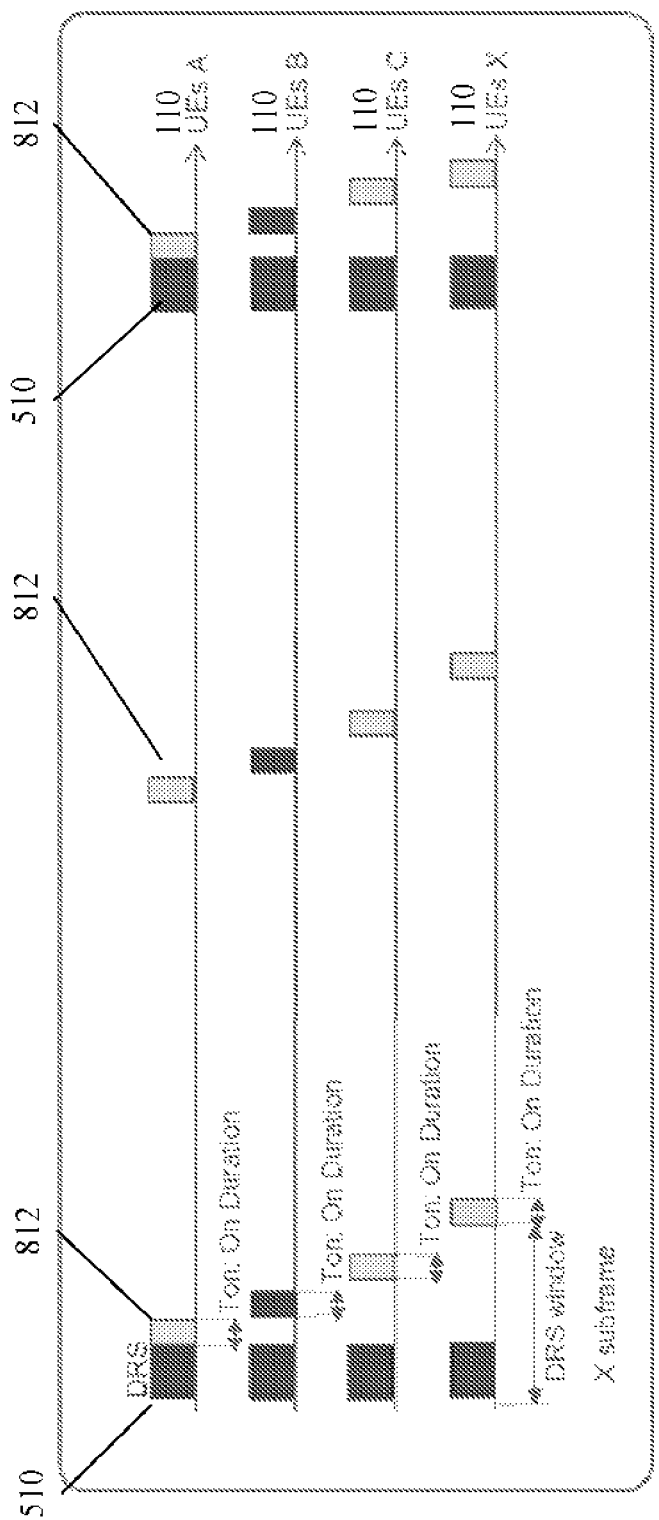
FIG. 8 illustrates an example of multiple discovery signal occasions for different groups of wireless devices, according to particular embodiments.

FIG. 8 illustrates an example of multiple discovery signal occasions for different groups of wireless devices, according to particular embodiments. The horizontal lines represent discovery signal and DRX timing for four example wireless device 110 groups (i.e. UEs A, UEs B, UEs C, and UEs X). The illustrated embodiment includes a plurality of DRS occasions 510 and a plurality of DRX onDurations 812 for each wireless device 110 group. Although four example wireless device 110 groups are illustrated, particular embodiments may apply to any number of wireless device 110 groups and each group may include any suitable number of wireless device 110.

In particular embodiments, onDuration 812 of the DRX cycle may be aligned in time with DRS occasion 510. As a particular example, onDuration 812 associated with the long DRX cycle may be aligned in time with DRS occasion 510. In particular embodiments, DRS occasion 510 may be located in the first subframe(s) of onDuration 812. In such example embodiments, wireless device 110 may be use DRS occasion 510 in the first subframe of onDuration 812 to derive the time/frequency estimates and update its tracking loops and also update estimates of the long term properties of the channel such as quasi-co-location (QCL) properties. In particular embodiments, wireless device 110 may perform RRM measurements at the same time on the DRS. In particular embodiments, wireless device 110 may store the subframes that contain the DRS so that it may perform demodulation on the same subframes after the previously mentioned properties are derived from the DRS.

In other embodiments, DRS occasion 510 may be located close in time to onDuration 812. To minimize the UE search window, DRS occasion 510 may be located within a set of subframes before onDuration 812 starts. In particular embodiments, onDuration 812 of the long DRX cycle may be located adjacent with the DRS. Wireless device 110 may wake up from DRX before onDuration 812 to measure the DRS to derive the time/frequency tracking of the channel and update long term properties of the channel such as QCL properties. In particular embodiments, the DRS may be located no more than X subframes before onDuration 812 of the long DRX period. The number of subframes may be measured in different ways (e.g., from the start of the DRS occasion, from the end of the DRX occasion, the middle of the DRS occasion, or any other suitable reference point).

As depicted in FIG. 8, the DRS windows before onDuration 812 are illustrated in a generic form. In particular embodiments, the DRS configuration may be limited to a set of subframes including subframes 0 and 5. For example, subframes 0 and 5 contain the PSS/SSS that may be used as one of the components of the DRS. In particular embodiments, the configuration of onDuration 812 may be limited based on subframes 0 and 5. For example, in particular embodiments onDuration 812 may only be configured X subframes following either a subframe 0 or 5 containing the PSS/SSS.

In particular embodiments, the DRX cycles are configured so that the measurement gaps defined for making inter-frequency measurements occur during the off durations of the DRX cycle so that wireless device 110 is able to make inter-frequency RRM measurements without compromising its ability to make RRM measurements on its serving cell which may be off except for the transmission of discovery signals.

In particular embodiments, the above may be achieved by grouping the DRX cycles of wireless devices 110 in the same way as the grouping of measurement gaps is performed. For example, considering the configuration of measurement gaps 515 in FIG. 7, three sets of DRX cycles may be configured for the three groups of wireless devices 110 corresponding to the three different measurement gaps 515. The cycles of each of the groups may be aligned so that measurement gap 515 corresponding to that group occurs during the Off Duration for that group. For example, wireless devices 110 configured with measurement gap 3 in the figure may have their On Duration occur in a set of subframes after measurement gap 3 even though the DRS occasion on the serving carrier may be aligned with one of the prior groups, 1 or 2.

Figure 9:
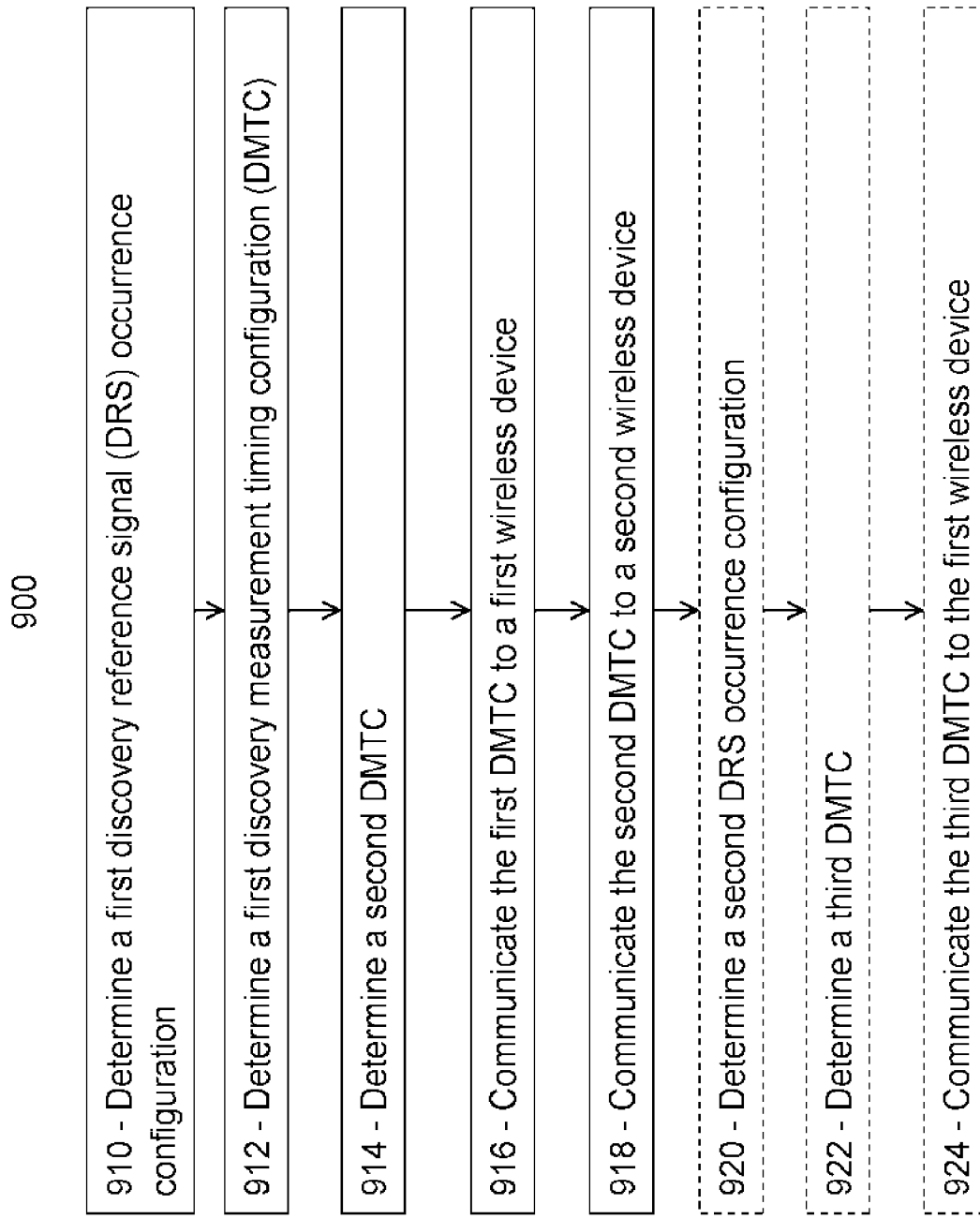
FIG. 9 is a flowchart of an example method in a network node of a wireless communication network for aligning DRS occurrences, according to a particular embodiment.

FIG. 9 is a flowchart of an example method in a network node of a wireless communication network for aligning DRS occurrences, according to a particular embodiment. In particular embodiments, one or more steps of method 900 may be performed by components of network 100 described with reference to FIGS. 1-13.

The method begins at step 910, where a network node determines a first DRS occurrence configuration. The first DRS occurrence configuration comprises a schedule for transmission of a first series of DRS occurrences. In particular embodiments, the first DRS occurrence configuration may be associated with a particular carrier frequency. For example, network node 115 may determine to transmit discovery signals to wireless device 110 every 40 ms on the primary carrier frequency. In particular embodiments, network node 115 may determine any appropriate periodicity for transmitting discovery signals. Particular configurations are described in more detail herein with respect to FIGS. 4-8.

At step 912, the network node determines a first discovery measurement timing configuration (DMTC). The first DMTC comprises a schedule for receiving DRS occurrences that is aligned with a first subset of DRS occurrences of the first series of DRS occurrences For example, network node 115 may determine a first DMTC for a first wireless device 110. In particular embodiments, the first DMTC may indicate to first wireless device 110 that first wireless device 110 should expect a DRS occurrence every 80 ms on the primary carrier frequency.

In particular embodiments, DMTC parameters may include (1) a duration of each occasion when discovery signal is transmitted (referred to as the DRS occasion), (2) a periodicity of the occurrence of the DRS occasion, and (3) timing (in terms of a start time or an offset from a reference point such as a particular frame and subframe number) of the DRS occasion. In particular embodiments, the DMTC parameters may be specified in terms of a subframe number for performing measurements. Particular embodiments may include other suitable parameters. Particular configurations are described in more detail herein with respect to FIGS. 4-8.

At step 914, the network node determines a second DMTC. The second DMTC comprises a schedule for receiving DRS occurrences that is aligned with a second subset of DRS occurrences of the first series of DRS occurrences, wherein the second subset of DRS occurrences is different than the first subset of DRS occurrences. For example, network node 115 may determine a second DMTC for a second wireless device 110. In particular embodiments, the second DMTC may indicate to second wireless device 110 that second wireless device 110 should expect a DRS occurrence every 80 ms on the primary carrier frequency, but at a periodicity 40 ms offset from that of the first DMTC configuration for first wireless device 110. Thus, second wireless device 110 measures a different subset of DRS occurrences on the primary carrier frequency than first wireless device 110 measures. In particular embodiments, the subsets may overlap.

In particular embodiments, any number of first wireless devices 110 may comprise a first group of wireless devices and any number of second wireless devices 110 may comprise a second group of wireless devices. The first group of wireless devices may all use the first DMTC configuration. The second group of wireless devices may all use the second DMTC configuration. Particular configurations are described in more detail herein with respect to FIGS. 4-8.

At step 916, the network node communicates the first DMTC to a first wireless device. For example, network node 115 may communicate the first DMTC to the first wireless device 110 using any suitable signaling mechanism for signaling between a network node and a wireless device.

At step 918, the network node communicates the second DMTC to a second wireless device. For example, network node 115 may communicate the second DMTC to the second wireless device 110 using any suitable signaling mechanism for signaling between a network node and a wireless device. In particular embodiments, first and second wireless devices may use the first and second DMTC, respectively, for performing discovery signal measurements.

In some embodiments, the method is complete after communicating the DMTC to the wireless devices. In other embodiments, the network node may continue to determine additional configuration parameters.

At optional step 920, the network node determines a second DRS occurrence configuration. The second DRS occurrence configuration comprises a schedule for transmission of a second series of DRS occurrences.

In particular embodiments, the second DRS occurrence configuration may be associated with a particular carrier frequency, different from the carrier frequency of step 910. For example, network node 115 may determine to transmit discovery signals to wireless device 110 every 40 ms on a secondary carrier frequency. In particular embodiments, network node 115 may determine any appropriate periodicity for transmitting discovery signals.

In particular embodiments, the first DMTC determined in step 916 comprises a schedule for receiving DRS occurrences that is suitable for receiving DRS occurrences of the second series of DRS occurrences. For example, wireless device 10 may use the first DMTC to make measurements on both the primary carrier frequency and the secondary carrier frequency. Particular configurations are described in more detail herein with respect to FIGS. 4-8.

At optional step 922, the network node determines a third DMTC. The third DMTC comprises a schedule for receiving DRS occurrences that is aligned with a first subset of DRS occurrences of the second series of DRS occurrences. For example, network node 115 may determine a third DMTC for the first wireless device 110. In particular embodiments, the third DMTC may indicate to first wireless device 110 that first wireless device 110 should expect a DRS occurrence every 80 ms on the secondary carrier frequency, but at a periodicity 40 ms offset from that of the first DMTC configuration for first wireless device 110. Thus, first wireless device 110 measures a different subset of DRS occurrences on the primary carrier frequency than the secondary carrier frequency. In particular embodiments, the subsets may overlap. Particular configurations are described in more detail herein with respect to FIGS. 4-8.

At optional step 924, the network node communicates the third DMTC to the first wireless device. For example, network node 115 may communicate the third DMTC to the first wireless device 110 using any suitable signaling mechanism for signaling between a network node and a wireless device. In particular embodiments, first wireless device 110 may use the received third DMTC for performing measurements on a secondary carrier frequency.

Modifications, additions, or omissions may be made to the method of FIG. 9. Additionally, one or more steps in the method of FIG. 9 may be performed in parallel or in any suitable order. The method may be repeated as necessary over time.

Figure 10:
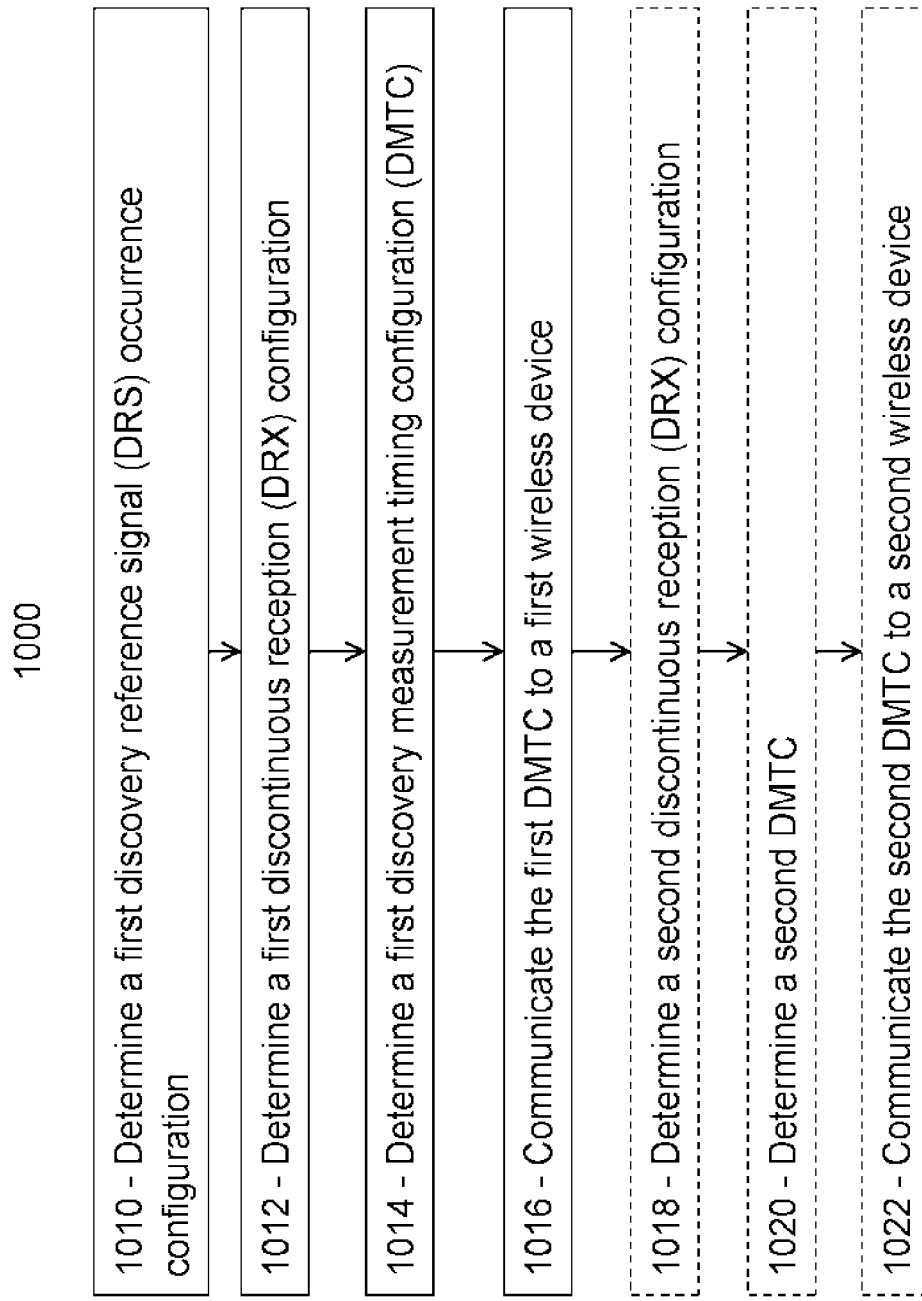
FIG. 10 is a flowchart of another example method in a network node of a wireless communication network for aligning DRS occurrences, according to a particular embodiment.

FIG. 10 is a flowchart of another example method in a network node of a wireless communication network for aligning DRS occurrences, according to a particular embodiment. In particular embodiments, one or more steps of method 1000 may be performed by components of network 100 described with reference to FIGS. 1-13.

The method begins at step 1010, where a network node determines a first DRS occurrence configuration. The first DRS occurrence configuration comprises a schedule for transmission of a first series of DRS occurrences. In particular embodiments, the first DRS occurrence configuration may be associated with a particular carrier frequency. For example, network node 115 may determine to transmit discovery signals to wireless device 110 every 40 ms on the primary carrier frequency. In particular embodiments, network node 115 may determine any appropriate periodicity for transmitting discovery signals. Particular configurations are described in more detail herein with respect to FIGS. 4-8.

At step 1012, the network node determines first discontinuous reception (DRX) configuration. The first DRX configuration comprising a schedule of DRX cycles for a first wireless device. For example, network node 115 may determine a first DRX configuration comprising a DRX cycle duration and a duration on duration within the DRX cycle for the first wireless device 110. Particular configurations are described in more detail herein with respect to FIG. 8.

At step 1014, the network node determines a first DMTC for the first wireless device. The first DMTC comprises a schedule for receiving DRS occurrences that is aligned with a first subset of DRS occurrences of the first series of DRS occurrences and the schedule of DRX cycles for the first wireless device. For example, network node 115 may determine a DMTC that instruct the first wireless device to perform discovery signal measurements during a DRX on duration. In particular embodiments, the first DMTC may instruct first wireless device 110 to perform discovery signal measurements in the subframes immediately preceding the DRX on duration, or at any other suitable time. Particular configurations are described in more detail herein with respect to FIG. 8.

At step 1016, the network node communicates the first DMTC to the first wireless device. For example, network node 115 may communicate the first DMTC to the first wireless device 110 using any suitable signaling mechanism for signaling between a network node and a wireless device. In particular embodiments, first wireless device 110 may perform measurements on the discovery signals according to the received first DMTC and its DRX cycle.

In some embodiments, the method is complete after communicating the first DMTC to the wireless device. In other embodiments, the network node may continue to determine additional configuration parameters.

At optional step 1018, the network node determines a second DRX configuration. The second DRX configuration comprises a schedule of DRX cycles for a second wireless device. For example, network node 115 may determine a second DRX configuration comprising a DRX cycle duration and an on duration within the DRX cycle for a second wireless device 110. In particular embodiments, the on duration for the second DRX configuration may occur at a different time than the on duration for the first DRX configuration. In particular embodiments, the second DRX configuration may overlap or even be the same as the first DRX configuration. Particular configurations are described in more detail herein with respect to FIG. 8.

At optional step 1020, the network node determines a second DMTC. The second DMTC comprises a schedule for receiving DRS occurrences that is aligned with a first subset of DRS occurrences of the first series of DRS occurrences and the schedule of DRX cycles for the second wireless device. For example, network node 115 may determine a second DMTC that instructs the second wireless device 110 to perform discovery signal measurements during a DRX on duration. In particular embodiments, the second DMTC may instruct second wireless device 110 to perform discovery signal measurements in the subframes immediately preceding the DRX on duration, or at any other suitable time. Particular configurations are described in more detail herein with respect to FIG. 8.

At optional step 924, the network node communicates the second DMTC to the second wireless device. For example, network node 115 may communicate the second DMTC to the second wireless device 110 using any suitable signaling mechanism for signaling between a network node and a wireless device. In particular embodiments, second wireless device 110 may use the received second DMTC for performing measurements.

Modifications, additions, or omissions may be made to the method of FIG. 10. Additionally, one or more steps in the method of FIG. 10 may be performed in parallel or in any suitable order. The method may be repeated as necessary over time.

FIG. 11 is a block diagram illustrating an example embodiment of a wireless device. The wireless device is an example of the wireless devices 110 illustrated in FIG. 1. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 1110, processor 1120, and memory 1130. In some embodiments, transceiver 1110 facilitates transmitting wireless signals to and receiving wireless signals from wireless network node 115 (e.g., via an antenna), processor 1120 executes instructions to provide some or all of the functionality described herein as provided by the wireless device, and memory 1130 stores the instructions executed by processor 1120.

Processor 1120 includes any suitable combination of hardware and software implemented in one or more integrated circuits or modules to execute instructions and manipulate data to perform some or all of the described functions of the wireless device. Memory 1130 is generally operable to store computer executable code and data. Examples of memory 1130 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory computer-readable and/or computer-executable memory devices that store information.

In particular embodiments, processor 1120 in communication with transceiver 1110 receives discovery signals from radio network node 115. Other embodiments of the wireless device may include additional components (beyond those shown in FIG. 11) responsible for providing certain aspects of the wireless device's functionality, including any of the functionality described above and/or any additional functionality (including any functionality necessary to support the solution described above).

FIG. 12 is a block diagram illustrating an example embodiment of a radio network node. Radio network node 115 can be an eNodeB, a node B, a base station, a wireless access point (e.g., a Wi-Fi access point), a low power node, a base transceiver station (BTS), a transmission point or node, a remote RF unit (RRU), a remote radio head (RRH), or other radio access node. Radio network node 115 includes at least one transceiver 1210, at least one processor 1220, at least one memory 1230, and at least one network interface 1240. Transceiver 1210 facilitates transmitting wireless signals to and receiving wireless signals from a wireless device, such as wireless devices 110 (e.g., via an antenna), processor 1220 executes instructions to provide some or all of the functionality described above as being provided by a radio network node 115; memory 1230 stores the instructions executed by processor 1220; and network interface 1240 communicates signals to backend network components, such as a gateway, switch, router, Internet, Public Switched Telephone Network (PSTN), controller, and/or other radio network nodes 115. Processor 1220 and memory 1230 can be of the same types as described with respect to processor 1120 and memory 1130 of FIG. 11 above.

In some embodiments, network interface 1240 is communicatively coupled to processor 1220 and refers to any suitable device operable to receive input for radio network node 115, send output from radio network node 120, perform suitable processing of the input or output or both, communicate to other devices, or any combination of the preceding. Network interface 1240 includes appropriate hardware (e.g., port, modem, network interface card, etc.) and software, including protocol conversion and data processing capabilities, to communicate through a network. In particular embodiments, processor 1220 in communication with transceiver 1210 transmits, to wireless device 110, discovery signals.

Other embodiments of radio network node 115 include additional components (beyond those shown in FIG. 12) responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 13:
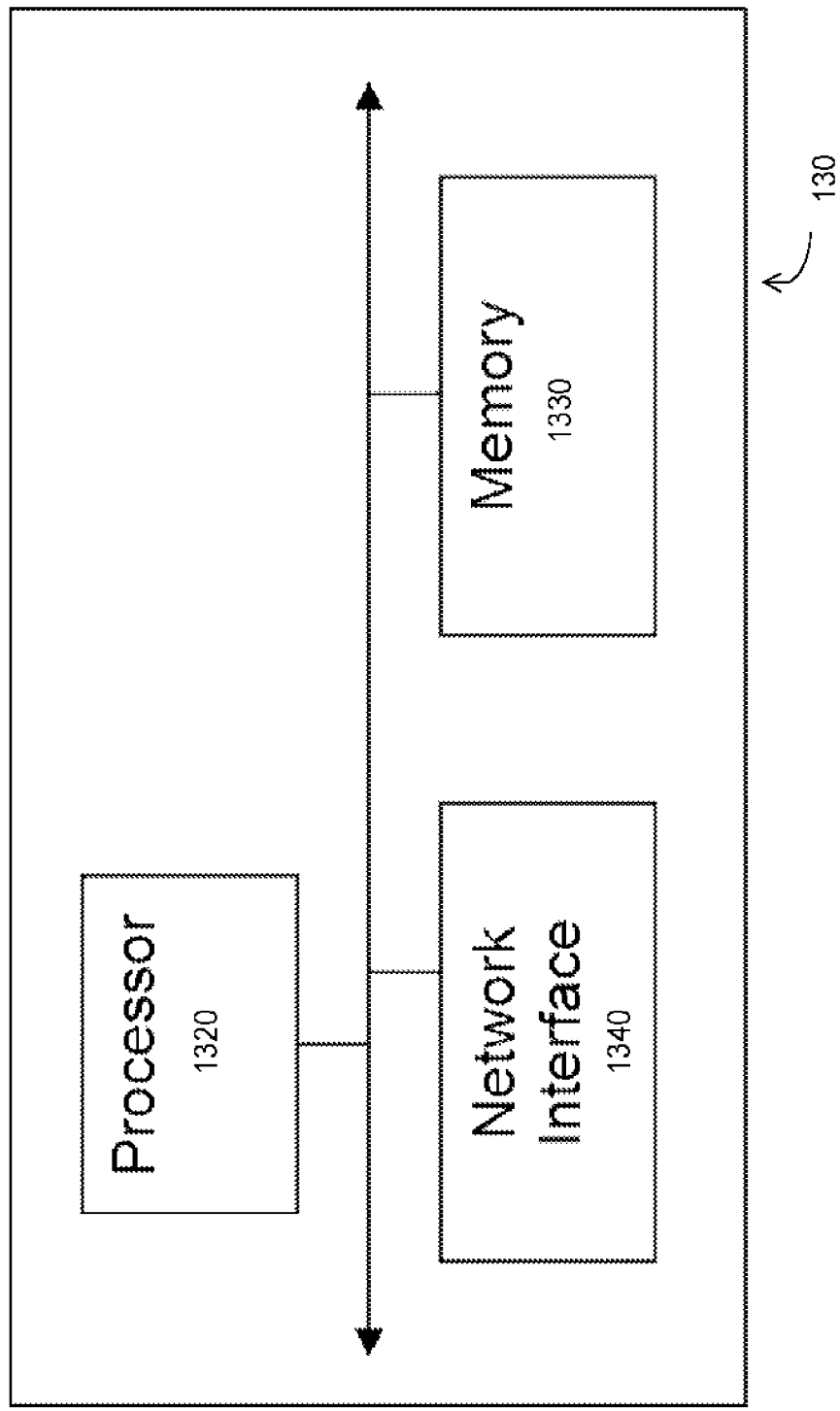
FIG. 13 is a block diagram illustrating an example embodiment of a core network node.

FIG. 13 is a block diagram illustrating certain embodiments of a radio network controller 120 or core network node 130. Examples of network nodes can include a mobile switching center (MSC), a serving GPRS support node (SGSN), a mobility management entity (MME) a radio network controller (RNC), a base station controller (BSC), and so on. The network node includes processor 1320, memory 1330, and network interface 1340. In some embodiments, processor 1320 executes instructions to provide some or all of the functionality described above as being provided by the network node, memory 1330 stores the instructions executed by processor 1320, and network interface 1340 communicates signals to a suitable node, such as a gateway, switch, router, Internet, Public Switched Telephone Network (PSTN), radio network nodes 115, radio network controllers 120, core network nodes 130, etc.

Processor 1320 may include any suitable combination of hardware and software implemented in one or more modules to execute instructions and manipulate data to perform some or all of the described functions of the network node. In some embodiments, processor 1320 may include, for example, one or more computers, one or more central processing units (CPUs), one or more microprocessors, one or more applications, and/or other logic.

Memory 1330 is generally operable to store instructions, such as a computer program, software, an application including one or more of logic, rules, algorithms, code, tables, etc. and/or other instructions capable of being executed by a processor. Examples of memory 1330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1340 is communicatively coupled to processor 1320 and may refer to any suitable device operable to receive input for the network node, send output from the network node, perform suitable processing of the input or output or both, communicate to other devices, or any combination of the preceding. Network interface 1340 may include appropriate hardware (e.g., port, modem, network interface card, etc.) and software, including protocol conversion and data processing capabilities, to communicate through a network.

Other embodiments of the network node may include additional components beyond those shown in FIG. 13 that may be responsible for providing certain aspects of the network node's functionality, including any of the functionality described above and/or any additional functionality (including any functionality necessary to support the solution described above).

A further embodiment provides a method in a network node of a wireless communication network for aligning discovery reference signal (DRS) occurrences. The method comprises determining 910 a first DRS occurrence configuration, where the first DRS occurrence configuration comprises a schedule for transmission of a first series of DRS occurrences. The method further comprises determining 912 a first discovery measurement timing configuration (DMTC), the first DMTC comprising a schedule for receiving DRS occurrences that is aligned with the first series of DRS occurrences. The network node then determines a second DRS occurrence configuration, the second DRS occurrence configuration comprising a schedule for transmission of a second series of DRS occurrences, and determines 912 a second discovery measurement timing configuration (DMTC), the second DMTC comprising a schedule for receiving DRS occurrences that is aligned with the first series of DRS occurrences. The method further comprises communicating 916 the first DMTC to a first wireless device, and communicating 918 the second DMTC to a second wireless device.

In a variant of this embodiment, the first DRS occurrence configuration comprises a start time and periodicity for the first series of DRS occurrences.

Some embodiments of the disclosure may provide one or more technical advantages. In particular embodiments, the systems and methods facilitate configuration of the timing of RRM measurements by wireless devices performed on discovery signals so that small cell on/off can be operated on the measured cells while ensuring that the network node has a wireless device available for scheduling on the serving cells. Another technical advantage may be that the systems and methods allow the use of a common measurement gap configuration to perform measurements on different carrier frequencies efficiently. Still another technical advantage may be that the systems and methods facilitate the flexible formation of multiple groups of wireless devices so that the occurrences of their measurement periods do not conflict with each other.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP 3rd Generation Partnership Project
CA Carrier Aggregation
CC Component Carrier
CDMA2000 Code division multiple access 2000
CRS Cell-Specific Reference Signal
CSI Channel State Information
CSI-RS Channel State Information Reference Symbols
DAS Distributed Antenna System
DM-RS Demodulation Reference Symbols
DMTC Discovery Measurement Timing Configuration
DRS Discovery Reference Signal
DRX Discontinuous Reception
eNB Enhanced Node-R
TDD Frequency Division Duplex
GSM Global System for Mobile communication
LAN Local Area Network
LTE Long Term Evolution
MAC Media Access Control
MAC-CE MAC Control Element
MAN Metropolitan Area Network
MIMO Multi-Input Multi-Output
OFDM Orthogonal Frequency-Division Multiplexing
PCC Primary Component Carrier
PCell Primary Cell
PDCCH Physical Downlink Control Channel
PSC Primary Serving Cell
PSTN Public Switched Telephone Network
PSS Primary Synchronization Signal
QCL Quasi Co-Location
RAT Radio Access Technology
RE Resource Element
RB Resource Block
RLM Radio Link Management
RRC Radio Resource Control
RRM Radio Resource Management
RSRP Reference Signal Received Power
RSRQ Reference Symbol Received Quality
RSTD Reference Signal Timer Difference
SCC Secondary Component Carrier
SCell Secondary Cell
SSC Secondary Serving Cell
SSS Secondary Synchronization Signal
TDD Time Division Duplexing
UE User Equipment
UMTS Universal Mobile Telecommunications System
WAN Wide Area Network
WiMAX Worldwide Interoperability for Microwave Access

The invention claimed is:

1. A method in a network node of a wireless communication network for aligning discovery reference signal (DRS) occurrences, the method comprising:
   determining a first DRS occurrence configuration, the first DRS occurrence configuration comprising a schedule for transmission of a first series of DRS occurrences;
   determining a first discontinuous reception (DRX) configuration, the first DRX configuration comprising a schedule of DRX onDuration cycles for a first wireless device;
   determining a first discovery measurement timing configuration (DMTC), the first DMTC comprising a schedule for receiving DRS occurrences that is aligned with a first subset of DRS occurrences of the first series of DRS occurrences and an onDuration of the schedule of DRX onDuration cycles for the first wireless device;
   communicating the first DMTC to the first wireless device;
   wherein:
     the first DRX configuration comprises a start time for the DRX cycles; and
     the first subset of DRS occurrences of the first series of DRS occurrences is aligned with the start time for the DRX onDuration cycles of the first schedule of DRX onDuration cycles for the first wireless device.

2. The method of claim 1, comprising:
   determining a second DRX configuration, the second DRX configuration comprising a schedule of DRX onDuration cycles for a second wireless device;
   determining a second DMTC, the second DMTC comprising a schedule for receiving DRS occurrences that is aligned with a first subset of DRS occurrences of the first series of DRS occurrences and an onDuration of the schedule of DRX onDuration cycles for the second wireless device; and
   communicating the second DMTC to the second wireless device.

3. A method in a network node of a wireless communication network for aligning discovery reference signal (DRS) occurrences, the method comprising:
   determining a first DRS occurrence configuration, the first DRS occurrence configuration comprising a schedule for transmission of a first series of DRS occurrences;
   determining a first discontinuous reception (DRX) configuration, the first DRX configuration comprising a schedule of DRX onDuration cycles for a first wireless device;
   determining a first discovery measurement timing configuration (DMTC), the first DMTC comprising a schedule for receiving DRS occurrences that is aligned with a first subset of DRS occurrences of the first series of DRS occurrences and an onDuration of the schedule of DRX onDuration cycles for the first wireless device;
   communicating the first DMTC to the first wireless device;
   wherein:
     the first DRX configuration comprises a start time for the DRX onDuration cycles; and
     each of the DRS occurrences of the first subset of DRS occurrences of the first series of DRS occurrences occur prior to the start time of each DRX onDuration cycle of the first schedule of DRX onDuration cycles for the first wireless device.

4. A network node comprising a processor operable to:
   determine a first DRS occurrence configuration, the first DRS occurrence configuration comprising a schedule for transmission of a first series of DRS occurrences;
   determine a first discontinuous reception (DRX) configuration, the first DRX configuration comprising a schedule of DRX onDuration cycles for a first wireless device;
   determine a first discovery measurement timing configuration (DMTC), the first DMTC comprising a schedule for receiving DRS occurrences that is aligned with a first subset of DRS occurrences of the first series of DRS occurrences and an onDuration of the schedule of DRX onDuration cycles for the first wireless device;
communicate the first DMTC to the first wireless device;
wherein:
  the first DRX configuration comprises a start time for the DRX cycles; and
  the first subset of DRS occurrences of the first series of DRS occurrences is aligned with the start time for the DRX onDuration cycles of the first schedule of DRX onDuration cycles for the first wireless device.

5. The network node of claim 4, the processor operable to:
determine a second DRX configuration, the second DRX configuration comprising a schedule of DRX onDuration cycles for a second wireless device;
determine a second DMTC, the second DMTC comprising a schedule for receiving DRS occurrences that is aligned with a first subset of DRS occurrences of the first series of DRS occurrences and an onDuration of the schedule of DRX onDuration cycles for the second wireless device; and
communicate the second DMTC to the second wireless device.

6. A network node comprising a processor operable to:
determine a first DRS occurrence configuration, the first DRS occurrence configuration comprising a schedule for transmission of a first series of DRS occurrences;
determine a first discontinuous reception (DRX) configuration, the first DRX configuration comprising a schedule of DRX onDuration cycles for a first wireless device;
determine a first discovery measurement timing configuration (DMTC), the first DMTC comprising a schedule for receiving DRS occurrences that is aligned with a first subset of DRS occurrences of the first series of DRS occurrences and an onDuration of the schedule of DRX onDuration cycles for the first wireless device;
communicate the first DMTC to the first wireless device;
wherein:
  the first DRX configuration comprises a start time for the DRX onDuration cycles; and
  each of the DRS occurrences of the first subset of DRS occurrences of the first series of DRS occurrences occur prior to the start time of each DRX onDuration cycle of the first schedule of DRX onDuration cycles for the first wireless device.

* * * * *